(12) United States Patent  
McGowan et al.

(10) Patent No.: US 11,884,312 B2  
(45) Date of Patent: Jan. 30, 2024

(54) OBJECT MACROCELLS IN FRAME LOCKED RASTERS FOR REAL-TIME DRIVING, POSITIVE TRAIN CONTROL, AND GENERAL PURPOSE ANTI-COLLISION

(71) Applicant: MIMAX, INC., Bothell, WA (US)

(72) Inventors: Scott McGowan, Federal Way, WA (US); Mark Spencer Chamberlain, Porter, TX (US)

(73) Assignee: Mimax, Inc., Des Moines, WA (US)

( * ) Notice: Subject to any disclaimer, the term of this patent is extended or adjusted under 35 U.S.C. 154(b) by 234 days.

(21) Appl. No.: 17/532,768

(22) Filed: Nov. 22, 2021

(65) Prior Publication Data

US 2022/0185349 A1    Jun. 16, 2022

Related U.S. Application Data

(60) Provisional application No. 63/125,310, filed on Dec. 14, 2020.

(51) Int. Cl.
| | |
|---|---|
| *B61L 27/20* | (2022.01) |
| *G06T 1/20* | (2006.01) |
| *G06V 20/58* | (2022.01) |

(52) U.S. Cl.  
CPC ............... *B61L 27/20* (2022.01); *G06T 1/20* (2013.01); *G06V 20/58* (2022.01); *B61L 2027/202* (2022.01); *G06T 2200/28* (2013.01)

(58) Field of Classification Search  
CPC .... B61L 27/20; B61L 2205/04; B61L 23/041; G06T 1/20; G06T 2200/28; G06T 19/00; G06V 20/58; G06V 10/751; G61L 2027/202

USPC ... 701/1, 10, 17, 19, 20, 423, 433, 448, 301  
See application file for complete search history.

(56) References Cited

U.S. PATENT DOCUMENTS

| | | |
|---|---|---|
| 6,262,695 B1 | 7/2001 | McGowan |
| 2018/0167627 A1* | 6/2018 | McGowan ........... H04N 19/423 |
| 2020/0280678 A1* | 9/2020 | Hariyani ................ H04N 23/80 |
| 2021/0099756 A1* | 4/2021 | Gnanapragasam .... G06V 20/41 |
| 2021/0385365 A1* | 12/2021 | Ma ........................ H04N 9/3141 |
| 2022/0035684 A1* | 2/2022 | Gupte ................... G06F 9/5083 |
| 2022/0122214 A1* | 4/2022 | Frisinger .................. G06T 1/20 |
| 2023/0041630 A1* | 2/2023 | Galor Gluskin ....... H04N 25/44 |

* cited by examiner

*Primary Examiner* — Hai H Huynh  
(74) *Attorney, Agent, or Firm* — Seed IP Law Group LLP

(57) ABSTRACT

A system for controlling movement of a vehicle that includes a camera system mounted on the vehicle and configured to generate image signals of terrain within the vehicle path of movement of the vehicle, a radar system mounted on the vehicle and configured to generate distance signals to an object in the terrain, and a processor having multiple GPU rasters in a series data processing configuration that are configured to utilize a hypotenuse processing function for drawing lines from pixel to moving entity center (MEC) or from macro cell center to MEC, and a detector configured to test for raster frame lock between the multiple GPU rasters structured to determine a relative speed of the vehicle with respect to the object in the path of movement of the vehicle, and to generate control signals to alter the direction or speed of the vehicle or both to avoid the object.

10 Claims, 19 Drawing Sheets

Pedestrian Object Macrocell Generator Raster System

Pedestrian Object Macrocell Generator Raster System 8 x 3 GPU Pedestrian Memory Raster Zone and Pedestrian Macrocell Generator 5 x 6 Truck Memory Raster Zone 5 x 6 Truck Memory Raster Zone Macrocell Generator Object Macrocells Feed to moving entity Vehicle Raster Object Macrocells Feed moving entity Top View
Raster with New Frame Differences Top View moving entity Raster with Typical and 90 Degree Scanning for Hypotenuse Rise-Run Data moving entity Raster and Road-Map Raster Absolute and Frame Differences
from Two Dual Head GPU's moving entity Raster and Road-Map Raster Absolute and Frame Differences
Rasters Streamed to Final Decisions FPGA All Rasters HDMI Fed to Optional Displays for Product Development or Driver Use Optional Displays for Product Development or Vehicle Occupant Use All Object Raster's Receive Feedback Values of
Hypotenuse Distance and Closure Rates Create Values of
Hypotenuse Distance and Closure Rates for Feedback Video Sprites Dual-Head GPU Raster A
Combined with Raster B Pixels of Road Height Limit Values Phase locked video camera frames feedback video stream loop,
for relative object speed processing, from difference pixels 1) Four Scan Lines for each train track and trains, two dual head GPU, to create 4 long scan lines of macrocells 2) Compressed train and safety zones, 32 bits deep, one pixel wide each 3) Scan line start for train track risk southbound-outer-safety-zone (SSZ) east-side (risk-east)

4) Scan line South-Train-Track (STT)

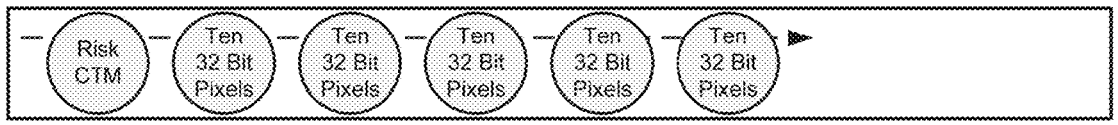

5) Scan line Nouth-Train-Track (NTT)

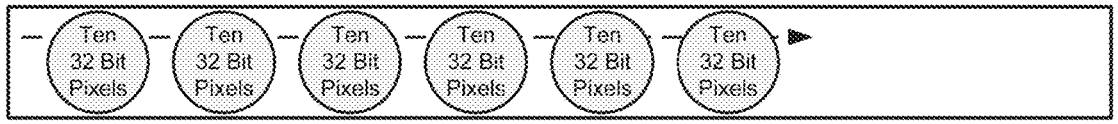

6) Scan line start for train track risk northbound-outer safety-zone (NSZ) west-side (risk-west)

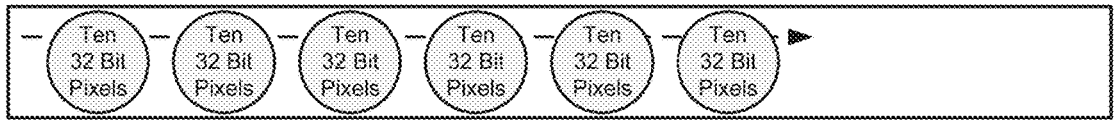

7) local large macrocell of fast-changing T (train), O (obstacle), and slow-changing S (slow restriction), W (workers)

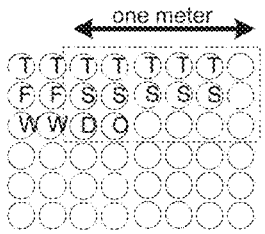
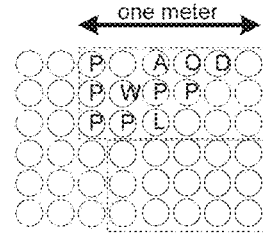

8) local large macrocell of fast-changing A (animal), P (pedestrian), L(Law Enf) and slow-changing O (obstacle restriction), W (worker zone)

9) Two, 4096 x 100 (North 1st, Sound 2nd temporally) phase-locked scan rasters = 4.096 kilometer of track length, cell/pixel data from multiple sources, of GPS on train, track (rail to rail) short circuit sensors, camera sensors, sound sensors, data base for rail worker real-time locations.

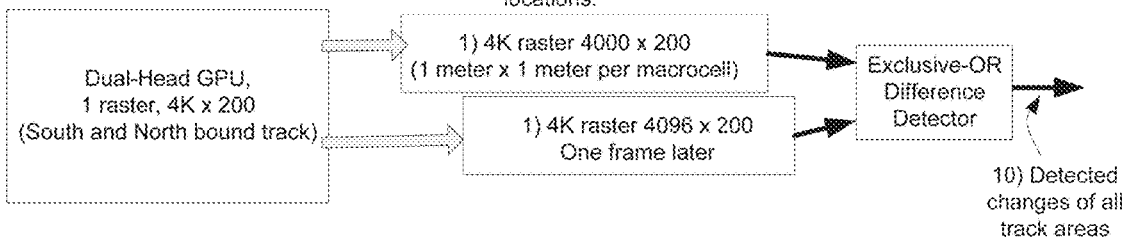

10) Detected changes of all track areas

Figure 13
Long narrow logical macrocell groups for positive train control,
640 x 4-kilometer track/risk zones, phase locked rasters frame-to-frame real-time difference detection Low cost, high speed, failure resistant, Train Control GPU electrical parts and software setup High reliability separated systems train or road traffic display system Hardware and software setup of GPUs and PC to real time process for auto/truck vehicle auto driving controls

OBJECT MACROCELLS IN FRAME LOCKED RASTERS FOR REAL-TIME DRIVING, POSITIVE TRAIN CONTROL, AND GENERAL PURPOSE ANTI-COLLISION

BACKGROUND

Technical Field

The present disclosure pertains to electronic and related methods for automated vehicle control in the context of intelligent transportation systems and, more particularly, to advanced driver-assistance systems or self-driving and driver-assisted vehicles that can execute safety-related, autonomous driving maneuvers, including collision avoidance, in real-time control of moving passenger and cargo vehicles, such as automobiles, trucks, buses, trains, aircraft, motorcycles, boats, and the like.

Description of the Related Art

Real-time driving and collision avoidance calculations for vehicle control are very demanding tasks for digital image data processing to achieve final control results in a required reaction time. Collision avoidance calculations for vehicle control must be done faster than classic processors and software can manage, as input to driving control is typically needed faster than $\frac{1}{6}^{th}$ of a second. Performance should exceed the performance of a human driver; a desired goal is to perform at least twice as fast as a human.

BRIEF SUMMARY

The present disclosure is directed to a system and method for a digital image processing system designed to avoid collision between moving entities. Examples of moving entities include but are not limited to automobiles, trucks, trains, aircraft, spacecraft, and other objects. The system employs a unique architecture for processing object macrocells in a frame locked multi-raster environment, also known as temporally coherent raster processors that are progressively processing spatial pixel data. One implementation applies to the popular system known as "Positive Train Control" (PTC) which runs on general purpose multitasking servers, with low quality of train location data, sometimes with zones longer than 1-mile, and low quality (high latency) for data processing, thus requiring slower train speeds and longer distances between trains. The PTC system suffers from poor performance when applied to passenger train systems for moving large numbers of persons quickly. Instead, using GPU pixilation, and GPU macrocell methods not only speed up the data processing, the GPU output rasters act both as a human system controller viewing method, but also, as a test for proper continuous function of the train control system.

In accordance with one aspect of the present disclosure, a system for detection and vehicle control is provided that includes one or more GPU rasters, and preferably six GPU rasters in a series data processing configuration (taking advantage of what is also known as PLV, Phase Lock Value, a term in the science of human or animal neuroglial processes, as applied to computing systems, that interact with human perception and human data processing. It also mimics human perception and human data processing, when periodic computing temporal-spatial results at the lowest latency possible due to multiple processes, in multiple circuits, that are, as a group, in phase lock) that are configured to utilize a hypotenuse processing function for drawing lines from pixel to pixel or from macrocell center to macrocell center; and a detector configured to test for raster frame lock, and ability to lower the multiple phase locked GPU rasters frame rate for safety of validation test, whereas a human test driver can out-pace, and thus override, the present disclosure method data processing, before a test accident could occur.

In accordance with another aspect of the present disclosure, the GPU includes a blitter that implements a bit-block transfer function.

As will be readily appreciated from the foregoing, vehicle driving and anti-collision control data processing for object to object or object to moving entity, key performance features include fast hypotenuse calculation, a real-time frame locked raster system, low cost, low wattage, and using raster scanning of position changing pixels or macrocells via the GPU feature of continuous raster scanning that creates real-time rise and run distance data.

BRIEF DESCRIPTION OF THE SEVERAL VIEWS OF THE DRAWINGS

FIG. 12 illustrates long narrow logical macrocell groups for positive train control 540×4-kilometer track/risk zones, phase locked rasters frame-to-frame real-time difference detection;

DETAILED DESCRIPTION

Figure 1:
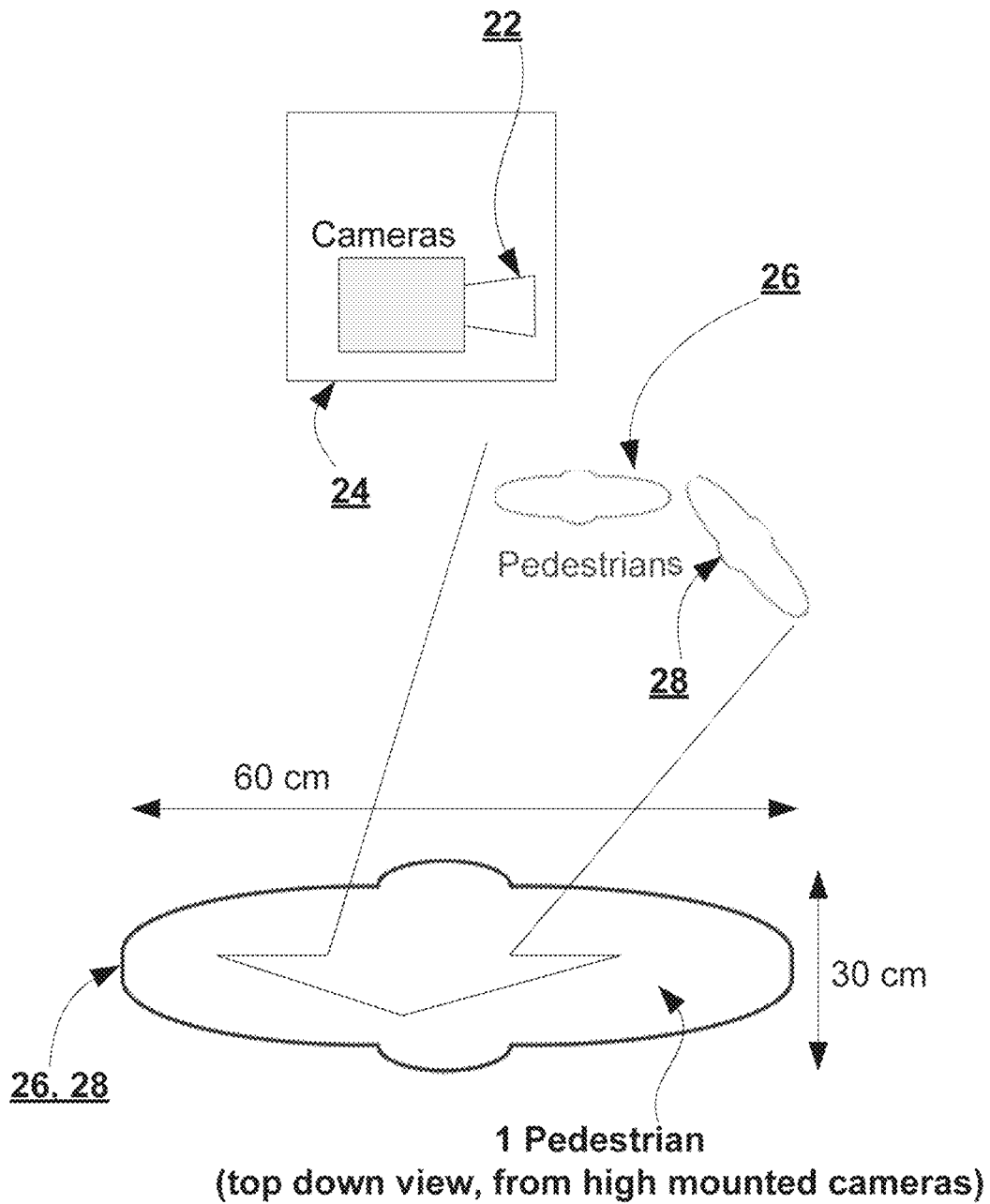
FIG. 1 is an illustration of a pedestrian object macrocell generator raster system deployed in the field.

In the following description, some specific details are included to provide a thorough understanding of the various disclosed implementations. One skilled in the relevant art will recognize that the disclosed implementations may be practiced without one or more of these specific details, or with other methods, components, materials, etc. In other instances, well-known structures associated with graphics processing, such as CPUs, GPUs, and control systems including microprocessors, memories, and drive circuitry have not been shown or described in detail to avoid unnecessarily obscuring descriptions of the implementations of the present systems and methods. Throughout this specification and the appended claims, the words "element" and "elements" are used to encompass, but are not limited to, all such structures, systems, and devices associated with GPUs, as well as their related programmable parameters.

Unless the context requires otherwise, throughout the specification and claims which follow, the word "comprise" and variations thereof, such as, "comprises" and "comprising" are to be construed in an open, inclusive sense, such as "including, but not limited to."

Reference throughout this specification to "one implementation" "an implementation," "another implementation," "one example," "an example," or "another example" means that a particular referent feature, structure, or characteristic described in connection with the implementation or example is included in at least one implementation or example. Thus, the appearances of the phrases "in one implementation," "in an implementation," "another implementation" or the like in various places throughout this specification are not necessarily all referring to the same implementation or example. Furthermore, the particular features, structures, or characteristics may be combined in any suitable manner in one or more implementations or examples.

It should be noted that, as used in this specification and the appended claims, the singular forms "a," "an," and "the" include plural referents unless the content clearly dictates otherwise. Thus, for example, reference to a graphics processing system including "a graphics processing unit" includes a single graphics processing unit or two or more graphics processing units. It should also be noted that the term "or" is generally employed in its generally accepted sense, including "and/or," unless the context clearly dictates otherwise.

The headings provided herein are for convenience only and do not interpret the scope or meaning of the implementations.

Introduction

Frame locking refers to a mechanism in which the scanning of two or more rasters are temporally synchronized. For example, the first pixel of a first raster scans and displays at the same time as the scanning and displaying of the first pixel of a second raster. Multiple frame locked GPUs (graphics processing units) are typically found in common computer graphics cards, and the multiple video rasters in each GPU's processing methods provide the fastest processing, lowest development cost, lowest production cost, and lowest wattage consumption versus typical general-purpose processors running software.

GPU rasters can process pixelated data (digital data stored in pixel format, such as 16, 18, 24, or 32 bits per pixel) and previously stored data of objects near the moving entity. This pixelated raw input object data, is used to create compressed macrocells that are typically a 10 to 1 reduction of data size containing maximum, minimum or average values of the physical object (that represent size, color, distance from moving entity's movement vector).

This high-speed multi-GPU data processing provides a real-time decision-making process to a vehicle's controls that would otherwise be too slow with typical processor and software, with their multiple layers of sub-routines and time lost in subroutine stack processing, and time lost in software methods of repetitive comparing of physical object lists relationships to the moving entity.

GPU processing also inherently improves the ability to study the data processing system metadata for object data collisions and collision avoidance, with a data output version that can be graphically shown to the human eye for easy human understating, both for real-time viewing or post event review.

Other past patents and applications have noted the use of multiple GPUs and multiple rasters, sometimes synchronized or fully phase locked, and sometimes not, for a mix of real-world useful duties. And most often, those duties are directly related to computer graphics functions. The method described herein uses uniquely configured and structured multiple GPUs and multiple rasters internal to the GPUs that have phase locked rasters, to quickly process, (taking advantage of what is also known as PLV, Phase Lock Value, a term of the science of neuroglial processes, as applied to computing systems, that interact with human perception and human data processing) record, and calculate against mostly non-human visual data of objects as they relate to a moving entity, and to use compressed macrocells of those objects to further speed up this process.

The use of graphics macrocells allows the final calculating rasters to be smaller, and thus can have very high frame refresh (fast continuous repeating re-scan) of all data, and thus produce a very fast reacting digital driving computer, where most of the digital work is done in GPUs using blitter circuits that perform movement and modification of pixel data within a computer's memory at a higher speed than the general purpose processor (CPU). Using blitter circuits also frees up the bandwidth and advanced capabilities of the associated CPU to concentrate on its remaining tasks, resulting in increased overall system performance.

General Description of a Representative Implementation

Collision avoidance calculations for vehicle control must be done faster than classic processors and software can manage because input to driving control is typically needed faster than $1/6^{th}$ of a second. This value could also be set as two times better than a human driver could manage.

In one implementation of the present disclosure, the device and system utilize frame locked multiple GPUs, and the multiple video rasters inside of the GPU scanned memory zones scan and process pixel data faster than 200 million pixels per second. Frame rates can easily exceed 120 frames per second, which can be stated as $1/120^{th}$ of a second. With 6 GPU rasters in a series data processing configuration to drive a computer, then processing is $6/120s$ of a second. The processing speed of $6/120s$ of a second reduces processing time to $1/20^{th}$ of a second, which exceeds the best human reaction time of $1/6^{th}$ of a second sensory reaction to driving control correction.

In one implementation of the present disclosure, three (3) dual-head GPU chips are provided and configured to have six rasters. Standard high-volume video memory is approximately $1/30^{th}$ the cost and utilize $1/30^{th}$ the size and wattage of common processors running software. The system employs macrocell processing, the nature of which is repetitious to the degree that GPUs with very modest amounts of Boolean logic can act on pixel data for all three tasks of pixel data movement, macrocell creations (compression of larger groups of pixels to smaller groups of pixels), and drawing lines from pixel to pixel or macrocell center to macrocell center. In effect, this can be described as equivalent to a hypotenuse processing function. A benefit of GPU rasters is that they are also more likely to remain frame locked for functional behavior than are general purpose processors, which can overstay their time in sub routines.

The device and system also include a detector to test for raster frame lock. Frame lock serves not only to make the data output results to the driving controls more stable, predictable, and faster, it also serves as one of several methods to test for both boot up and real-time operation non-error status checking.

Final feedback values of the hypotenuse results for relative and absolute speeds, accelerations, and vectors of objects from the output data will feed back to the original pixel and macrocells of objects to mark that pixel data for risk levels per object, particularly as the objects relate to the moving entity.

GPU rasters with HDMI output ports serve to provide a human view for the real-time object and moving entity position, speed, acceleration, and vector data, and also to move pixel and macrocell data to neighboring rasters inside other GPU input video bus ports. Data can also be simultaneously moved from raster to raster—no matter with which GPU—by way of the PCI express bus, and those data transfers, like the HDMI ports, can be triggered on vertical sync, also known as display frame-start.

Both the output HDMI ports and video input ports of a GPU can operate at bit rate speeds over 1 GHz. Because they are self-repeating continuously, they dramatically off-load work from the motherboard processor software. If need be, the GPUs can be located in different areas of a vehicle, as to provide for the fewest high speed periodic repetitious long distances from 10 or 100 feet, which reduces wire and EMI (electromagnetic interference).

A blitter is a circuit, common to modern GPU chips, that implements pixel Boolean Block-Line-Transfer functions. Use of the GPU's built-in blitters provide additional advantages to this device and system. The blitter copies pixel video data from one location to another in groups of pixels, and it processes arithmetic Boolean logic on those transfers to include addition of a group, averages, and max/min value finds. Blitters can also move data from one raster to any other raster in the same or different GPUs via the motherboard's DMA (direct memory access) commands to further reduce motherboard processor software loading.

These GPUs, where possible, would be framed locked preferably by the method described in U.S. Pat. No. 6,262,695 via pixel clock subtraction, and more modern improvements of clock subtraction (for the purpose of frame locking) over the original '695 patent method, and where frame lock is accurate within a few nanoseconds, and takes only a software switch to turn the phase lock hardware function on or off. A second choice for frame locking is by approximate frame locking from software methods that temporally alter GPU registers to effect raster periods until a slave raster times within 100 pixels of another raster. Because vertical blank periods typically are thousands of pixels long, 100 pixels of matched raster timing is sufficient in the present disclosure for a temporally locked macrocell raster to raster data sharing of the kind specified herein.

Near final results of the fast, low cost, top view compressed macrocell rasters of objects of concern to the top view moving entity, and the road data that has been previously stored or sensor input, feeds to regular and 90 degree raster scanning of the moving entity center, in a raster providing real-time Rise and Run (X to X and Y to Y pixel object's distance counting) data to then calculate the hypotenuse for fast, high quality distance, vector, and speed data results. These results are utilized to directly and rapidly effect vehicle controls. The X counting is the same as counts of horizontal scans of pixels passing a point in a circuit, and likewise the Y counting is the same as counts of vertical counts (which as horizontal sync pules) passing a point in a circuit.

In the final raster's results, the X1 to X1 Run data is created by the object's absolute or relative X pixel position on each 1 horizontal scan line, to the moving entity's X pixel location. Likewise, a 90-degree scan of the same data, creates the objects absolute or relative Y1 to Y1 Rise data, via apparent horizontal scanning raster data, which is however actually vertical data, due to the 90-degree scan function that modern GPUs have built in.

Referring next to FIGS. 1-3A and 3B, shown therein is an implementation of a pedestrian (PED) object macrocell generator raster system 20 formed in accordance with the present disclosure. FIG. 1 illustrates the real-world depiction of a camera system 22, which could be one or more cameras, (to include two sensor video cameras whose image sensors are in phase lock, and thus act as a stereo camera system, to calculate distance estimations to visual objects, both still and moving, which provides a distance function that has previously been done by more costly LiDAR Light-Radar, for distance input data for ADS, Automated driving Systems) and which could be used in connection with a vehicle 24. The camera system 22 can utilize readily commercially available cameras and the camera system 22 will not be described in detail. Briefly, the camera system 22 may include other data gathering devices, such as infrared sensors, microphone to detect sound, and moisture detectors to sense the presence of water, such as rain or snow. In the context of the present disclosure, the camera system 22 preferable includes at least one or more cameras on the vehicle. The cameras are a prime or initial source of incoming real-time data that is processed by the processor and the multiple GPU rasters in the processor to be translated into macrocell types of objects.

Also depicted in FIG. 1 are representations of two pedestrians 26, 28 located in front of the camera system 22. The first pedestrian icon 26 is located forward and to the left of the camera system 22, while the second pedestrian icon 28 is more in front of the vehicle 24 such that a collision could occur if the vehicle 24 were to continue towards the pedestrian icon 26 in a straight line.

Figure 2:
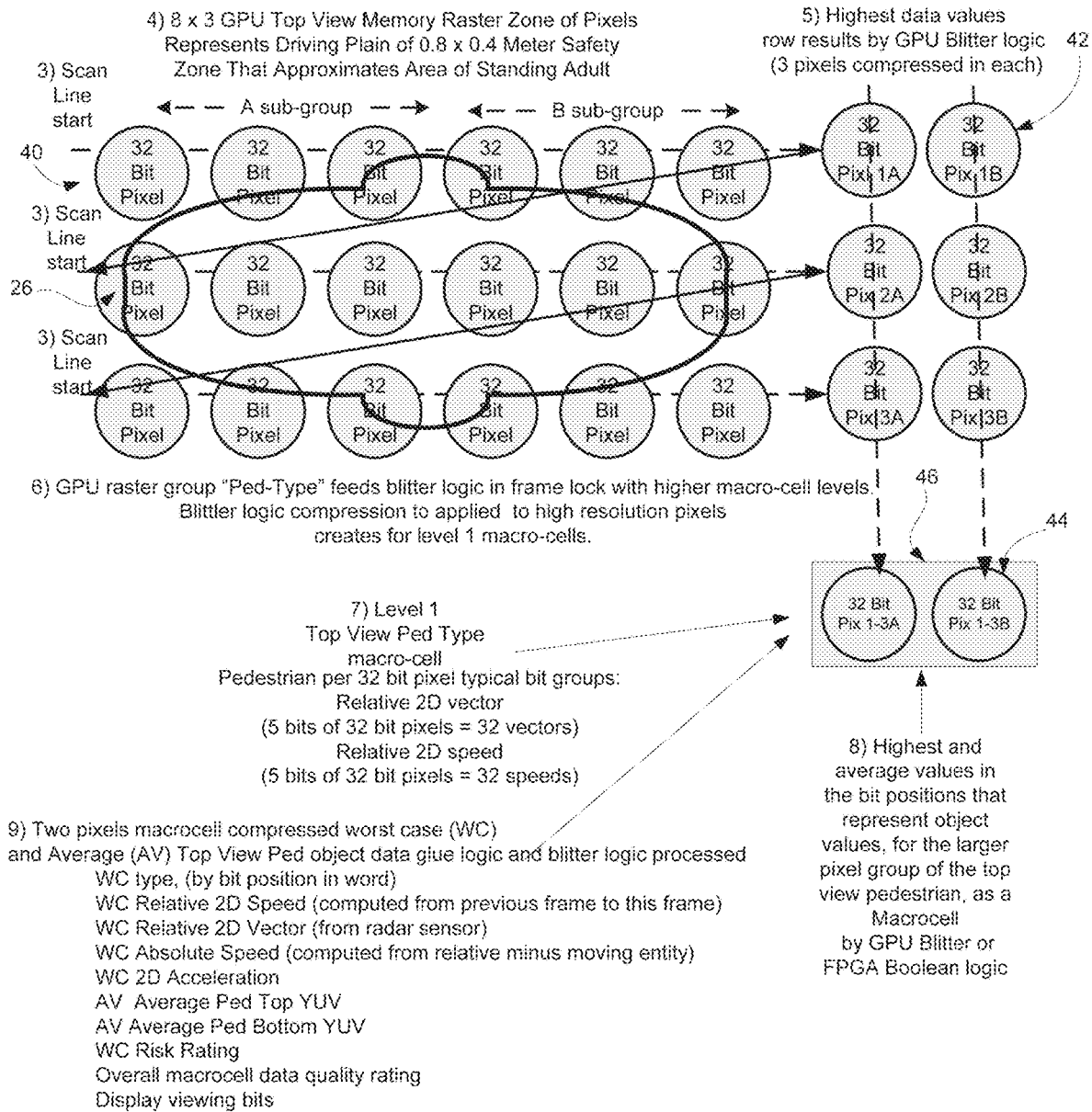
FIG. 2 is an illustration of an 8×3 GPU memory raster zone of pixels and resulting compression of same for the system of FIG. 1.

In addition, FIG. 1 illustrates one representation of the pedestrian icons 26, 28, having an oblong shape with a semi-circular, convex bulb 29 at the center of both elongate sides of the icon 26, 28. Each pixel of the display shown in FIG. 2 represents an area of ground of roughly 10 cm by 10 cm. As shown, the pedestrian icons 26, 28 have a length of about 60 cm and a depth of about 30 cm. Highest resolution rasters (for real world measurements down to the granularity of centimeters) continuously read scan data that covers all of a pedestrian driving plane zone.

FIG. 2 is an illustration of an 8×3 GPU memory raster zone of pixels 40 and resulting first compression zone 42. A second compression zone 44 is also shown below the first compression zone 42, in which the two columns of compressed pixels are further compressed into a macrocell 46. The zone of pixels 40 represents a driving plane of 0.8 meter by 0.4-meter safety zone that approximates the area of a standing adult, represented by the pedestrian icon 26 superimposed over the memory raster zone 40.

The array of 32-bit pixels is arranged in three rows of six columns, the first three columns constitute sub-group A and the second three columns constitute sub-group B. After the sixth column, each row has two additional columns that constitute the first compression zone 42, in which the first column constituted by compressed pixel 1A and the second column constituted by compressed pixel 1B, with three pixels compressed into each compressed pixel A, B. These compressed pixels A, B have the highest data values in the row as a result of GPU blitter logic, which is explained more fully below. Essentially, the GPU raster group "PED-Type" feeds blitter logic in frame lock with higher macrocell levels. Blitter logic compression is applied to high resolution pixels to create level 1 macrocells that are of fewer pixels.

The macrocell 46 represents a level 1 PED Type macrocell. A single pedestrian per 32-bit pixel, with typical bit groups: Relative 2D vector (5 bits of 32-bit pixels equals 32 vectors, Relative 2D speed (5 bits of 32-bit pixels equals 32 speeds. Highest and average values in the bit positions of a macrocell pixel that represent object values, for the larger pixel group of the pedestrian, as a macrocell by the GPU Blitter or FPGA Boolean logic.

In addition, the two-pixel macrocell 46 compressed worst case (WC) and Average (AV) Ped object data:
  WC type, (by bit position in word)
  WC Relative 2D Speed
  WC Relative 2D Vector
  WC Absolute Speed
  WC 2D Acceleration
  AV Average Ped Top YUV
  AV Average Ped Bottom YUV
  WC Risk Rating For the WC Risk Rating, a dynamic database provides numeric low to high collision risk ratings for various macrocell types. Collision risk ratings (or just risk ratings) can change with the weather, day and night conditions, and whether an object type shows more or less erratic or danger indicating movement.

Figure 3A:
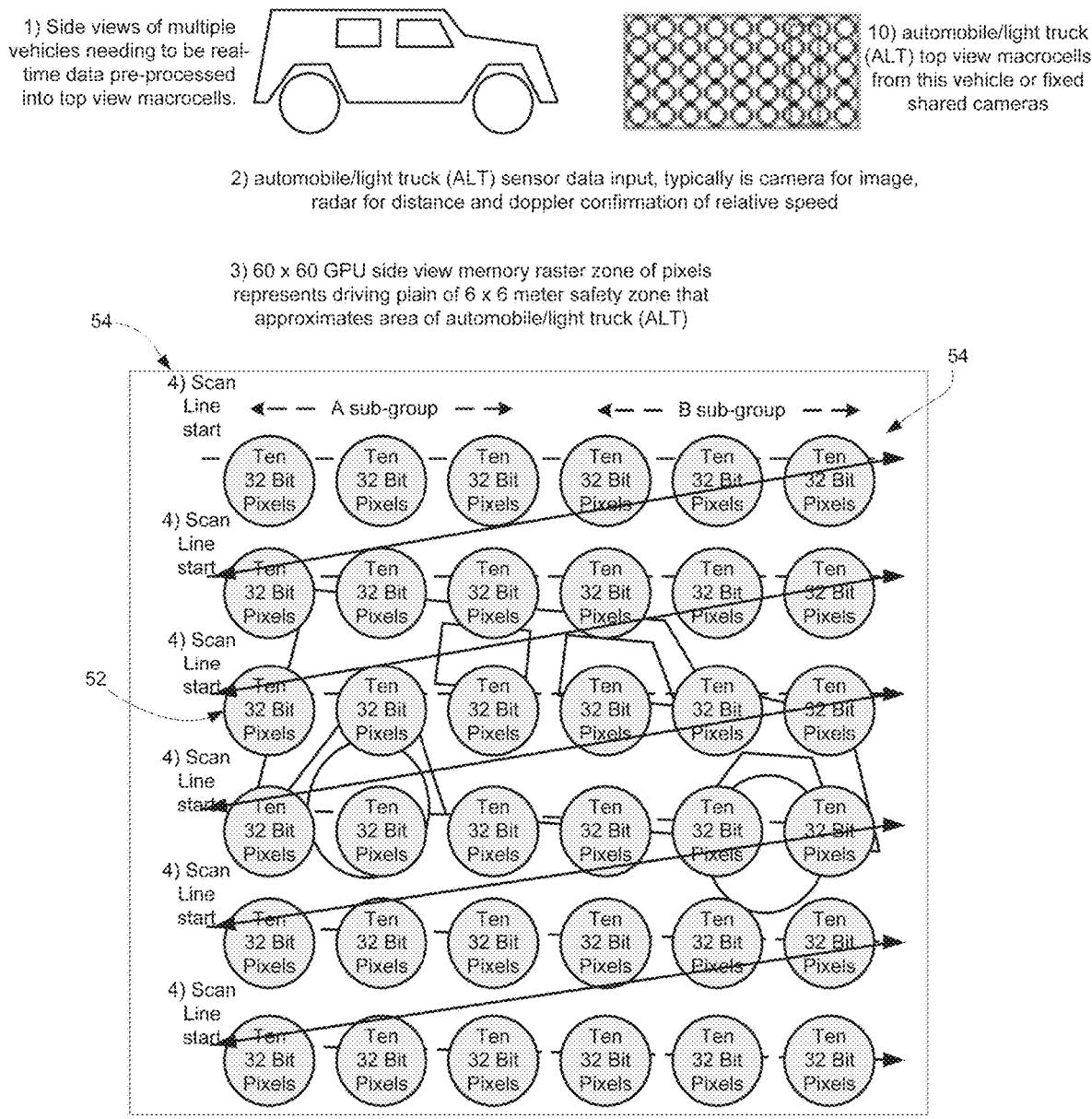
FIGS. 3A-3B are illustrations of an automobile light truck object macrocell generator raster system formed in accordance with the present disclosure.
Figure 3B:
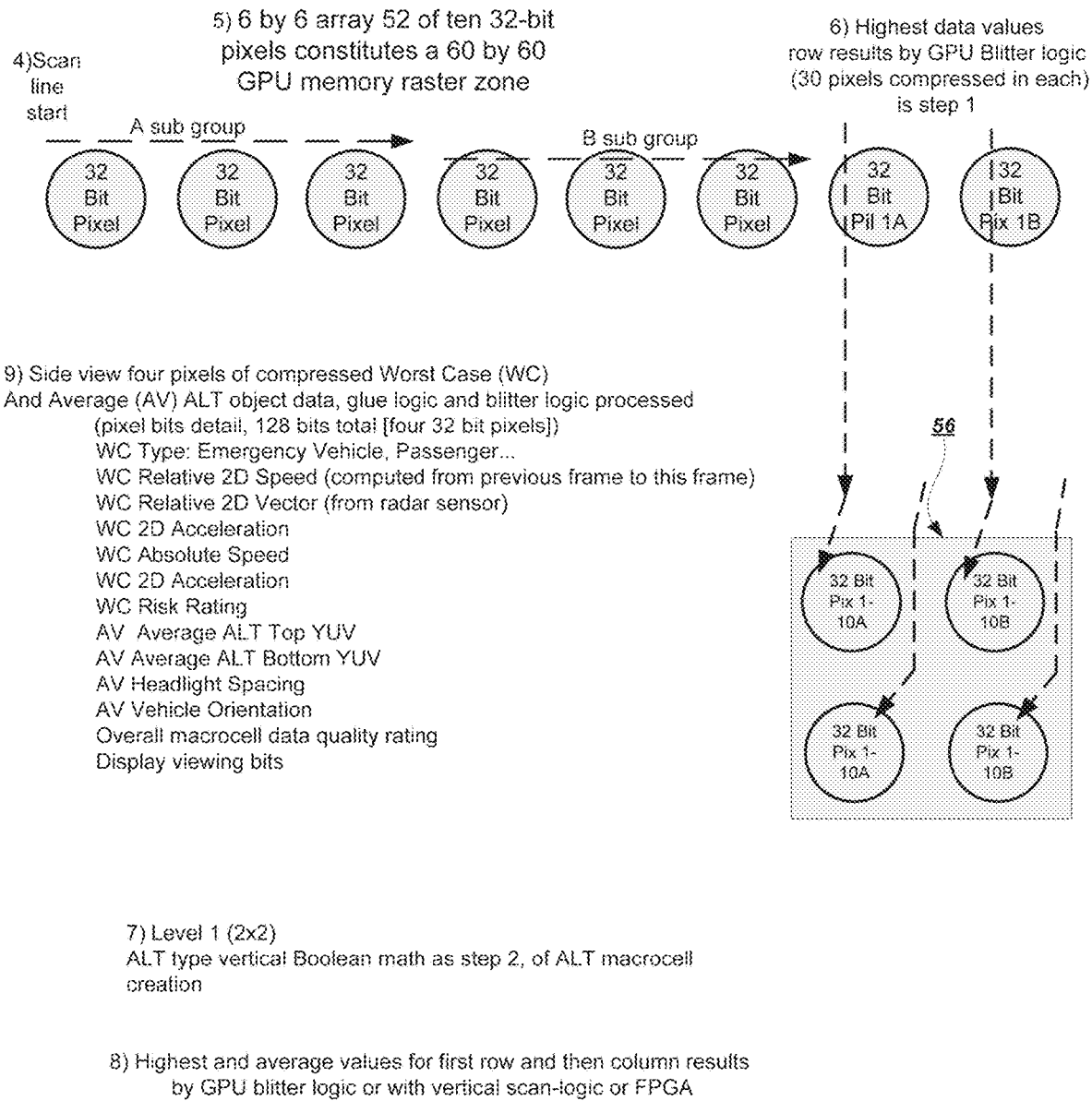
Figure 5:
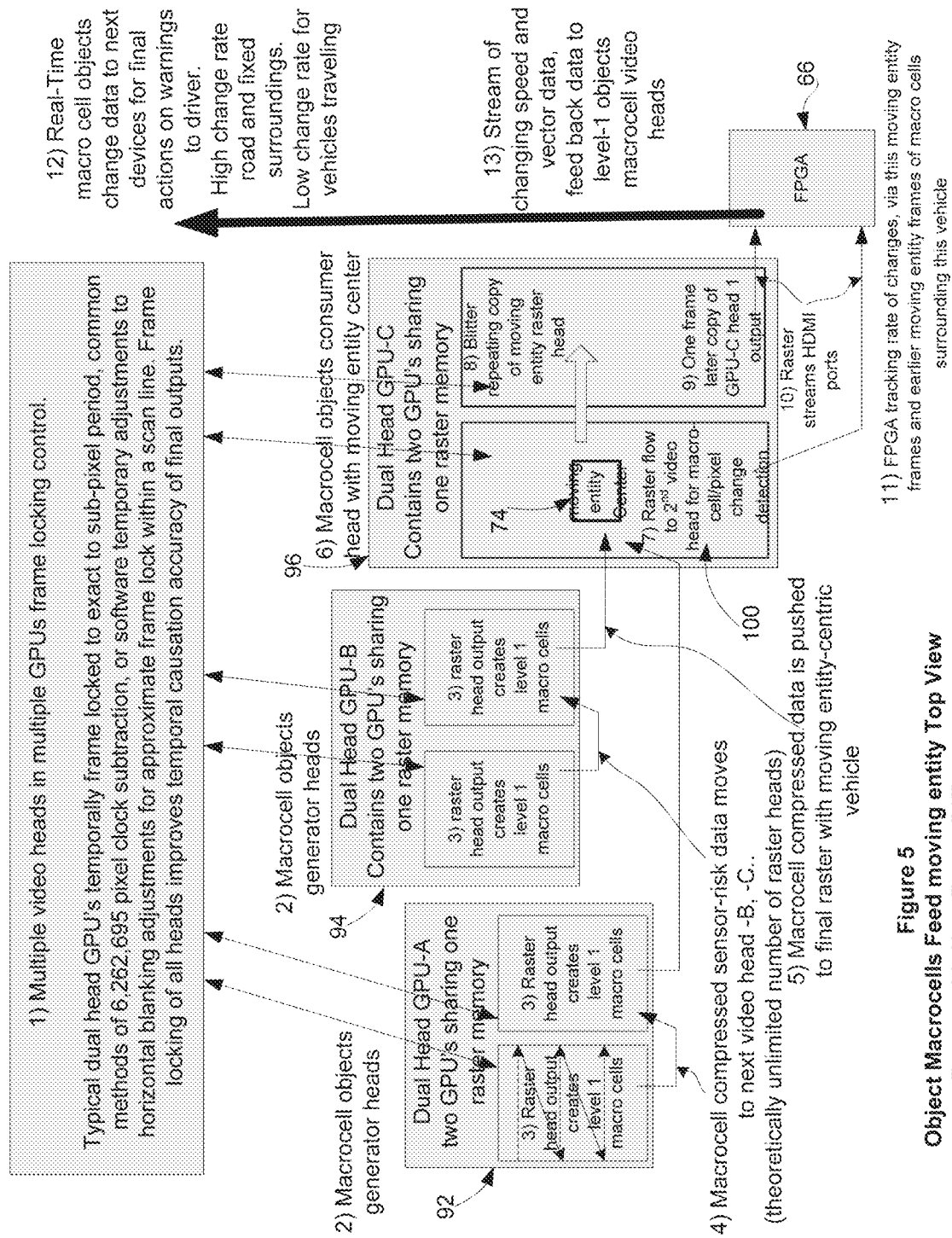
FIG. 5 is an illustration of an object macrocell feed to a final top view moving entity raster of macrocells with new frame differences.

FIG. 3A 5×6 Truck Memory Raster Zone
and
FIG. 3B 5×6 Truck Memory Raster Zone Macrocell Generator FIGS. 3A and 3B illustrate an automobile and light truck object macrocell generator raster system 50 formed in accordance with another implementation of the present disclosure. This system utilizes outlines of multiple vehicles needed to be real time data preprocessed. Automobile and light truck (ALT) sensor data input can be from camera or radar sensors that need real time compression and additional processing. A 6 by 6 array 52 of ten 32-bit pixels constitutes a 60 by 60 GPU memory raster zone of pixels that represents a driving plane of 6 by 6 meter safety zone, which approximates the area of an automobile or light truck. The array includes the first three columns in subgroup A and the second three columns in subgroup B. The diagonal lines with arrowheads represent the step of scanning the array.

The GPU has a raster group of type "ALT" pixels that feed a blitter logic circuit in frame lock toward higher macrocell levels. Blitter logic compression is applied to high resolution pixels to create level 1 macrocells. The highest data values for each of the row results from the GPU blitter logic form two additional columns after the sixth column that constitute a first compression zone 54, in which the first column is constituted by compressed pixel 1A and the second column constituted by compressed pixel 1B, with 30 pixels compressed into each compressed pixel A, B, forming compressed pixels 1A, 1B, 2A, 2B . . . 6A, 6B.

The ALT macrocells 56 of level 2 are then created using ALT type vertical Boolean math as step 2 of the ALT macrocell creation. The highest and average values for the first row and then column results by using blitter logic circuits or with vertical scan logic circuits or Field Programmable Gate Array (FPGA) circuitry. This forms the macrocell 56 of four 32-bit pixels as shown in FIG. 3.

Four pixels of compressed Worst Case (WC) and Average (AV) ALT object data:
  WC Type: Emergency Vehicle, Passenger . . .
  WC Relative 2D Speed
  WC Relative 2D Vector
  WC 2D Acceleration
  WC Absolute Speed
  WC 2D Acceleration
  WC Risk Rating
  AV Average ALT Top YUV
  AV Average ALT Bottom YUV
  AV Headlight Spacing
  AV Vehicle Orientation The AV Vehicle Orientation refers to the orientation of the other vehicle or object to the road lanes as perfect or as steps of less than perfect.

Figure 4:
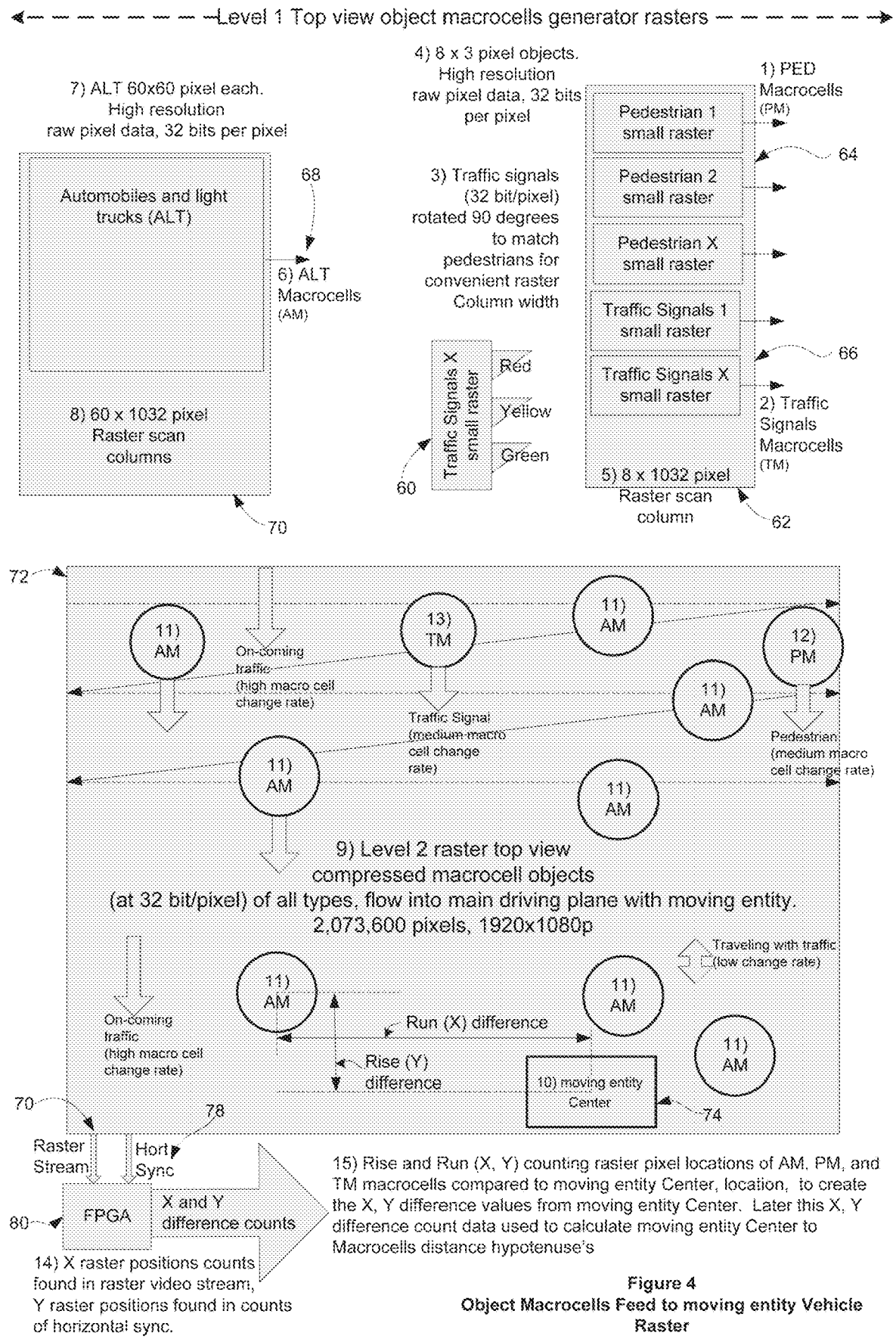
FIG. 4 is an illustration of object macrocell feed to a moving entity raster.

FIG. 4 illustrates a real-world application of the foregoing systems of the present disclosure. In this illustration, Levels 1 and 2 in the creation of the macrocells for both ALT and PED and in addition the incorporation of a traffic signal raster 60. The traffic signal small raster 60 obtains traffic signals at 32 bits per pixel, rotated 90 degrees to match pedestrians for a convenient column width.

A raster scan column 62 is shown to include both PED macrocells (PM) 64 and traffic signal macrocells (TM) 66, both formed of small rasters 1-n, where n represents a number of rasters from 1 to 6 and, in some applications, greater than 6, such as 8 to 16. The raster scan column 62 is an 8 by 1032-pixel raster scan column.

The ALT macrocells (AM) 68 are shown in connection with a 60 by 1032-pixel raster scan column 70 where the ALT is preferably constituted by 60 by 60 pixels each, high resolution raw pixel data at 32 bits per pixel.

The level 2 raster 72 illustrates compressed macrocell objects, preferably at 32 bits per pixel. All three macrocell types (AM, PM, and TM) are illustrated with the raster scan shown by the diagonal lines with arrow heads at each line. As shown by the downward pointing outlined arrows, the macrocells (11 AM, 12 PM, and 13 TM) flow into a main driving plane that is coordinated with the vehicle (referred to herein as the moving entity and moving entity center (MEC)), and is shown in the FIGS. as the "moving entity center" 74. The macrocell change rate will be at a high rate for oncoming traffic and at a lower rate for travelling with traffic. The traffic signal macrocell 66 change rate will be about medium, meaning in between the high and low rates for traffic.

The raster stream 76 and horizontal sync 78 signals are fed to a field programmable gate array (FPGA) 80. The run difference (X) and the rise difference (Y) of the macrocells is counted. The X raster position counts are found in the raster video stream whereas the Y raster positions are found in the counts of the horizontal sync signal.

The rise and run (X,Y) counting raster pixel locations of AM, PM, and Tm macrocells is compared to the moving entity center 74 location to create the X, Y difference values from the moving entity center. This X, Y difference count data is then used to calculate moving entity center 74 to the macrocell's distance hypotenuses (as distance to object input data, which is needed by ADS Automated Driving Systems).

This calculation is typically done with synchronous counters to provide the X and Y difference, and with the industry standard methods used to calculate the right angle hypotenuse from (A) slowest method, of: Square root of $\{[X_1-X_2)^2]+(Y_1-Y_2)^2\}$ to look up table estimate values, and can also be done with another method, (B) industry known method of another connected GPU where the bit values $(X_1-X_2)$ next to $(Y_1-Y_2)$ are used to make all the bits of the pixel parallel memory address to look up a pixel value, which contains a pre-calculated hypotenuse value, and (C) other methods common to the field of calculation circuits.

FIG. 5 illustrates the object macrocells system 90 configured for feeding a moving entity raster 100 with new frame differences. As shown therein, there are three dual head GPUs 92, 94, 96 temporarily frame locked to exact sub-pixel period, such as disclosed in U.S. Pat. No. 6,262,695 pixel clock subtraction. Alternatively, software implemented temporary adjustments to horizontal blanking adjustments for approximate frame lock within a scan line can be made. Frame locking of all the GPU's video raster heads improves temporal causation accuracy of final outputs. That is, when the GPUs are temporally frame locked, they complete frames in a very determined time allotment. Thus, there is no delay for multiple frames to pass because all rasters will have completed a pass of processing data on a given incoming data set in a temporal frame of time that closely matches to or are whole number multiples of the raster period of the largest final macrocell raster.

Each of the dual-head GPUs 92, 94, 96 contains two GPUs sharing one raster memory to create the level 1 macrocells. These are fed to the macrocell objects consumer head with moving entity center GPU 96, which outputs via HDMI ports to the FPGA 80. The FPGA tracking rate of changes, via these moving entity frames and earlier moving entity frames of macrocells surrounding the moving entity. Real time macrocell objects change data to the next device(s) for final actions on warnings to drivers, vehicle control, etc. A high change rate is used for road and fixed surroundings and a low change rate is used for vehicles traveling in the same direction. The stream of changing speed and vector data, and feedback data are sent to level 1 objects macrocell video heads.

Figure 6:
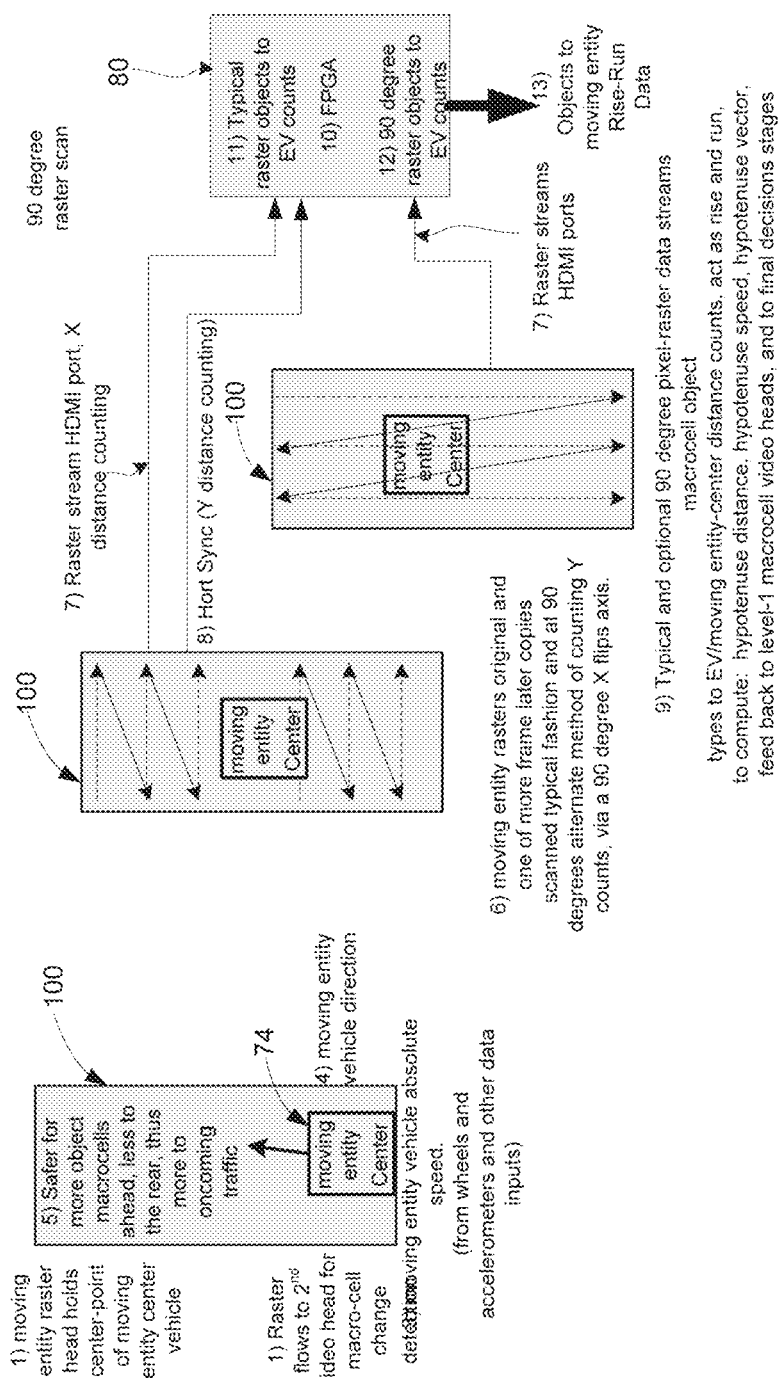
FIG. 6 is an illustration of a top view moving entity raster with (run) scan line pixel FPGA counting and (rise) line FPGA counting for calculation of hypotenuse from rise-run data.

FIG. 6 illustrates the moving entity raster 100 associated with the moving entity center 74 or moving entity, with typical and 90 degree scanning for hypotenuse rise-run data. The moving entity raster 100 holds a center point of the moving entity center. The raster 100 flows to a second video head for macrocell change detection. The moving entity absolute speed (from wheels and accelerometers and other data inputs) and the moving entity direction are used to provide safety for more object macrocells ahead of the moving entity with less to the rear. Thus, more safety is provided for oncoming vehicles.

FIG. 6 shows the moving entity raster 100 original and a second raster frame-delayed scanned in typical fashion. Also shown is a set of the same raster data (original and one frame delayed), but rather scanned at 90 degrees. This alternate method includes regular and 90 degree scanning, and thus of continuing Y counts via a 90-degree X flipped axis. This provides fast information indicating that movement of objects is happening mostly in X or Y directions. As discussed above, the raster streams via the HDMI port the X distance counting, and the horizontal sync (Y distance counting) is also streamed to the FPGA 80. Typical and optional 90 degree pixel-raster data streams from the macrocell object types (AM, TM, PM) to the moving entity or moving entity center 74 distance counts, which act as the rise and run, to complete the hypotenuse distance (that has previously been handled by more costly LiDAR, Light-Radar, for distance input data for ADS, Automated driving Systems), hypotenuse speed, and hypotenuse vector, which are fed back to the level 1 macrocell video heads, and thence to the final decision stages.

Figure 7A:
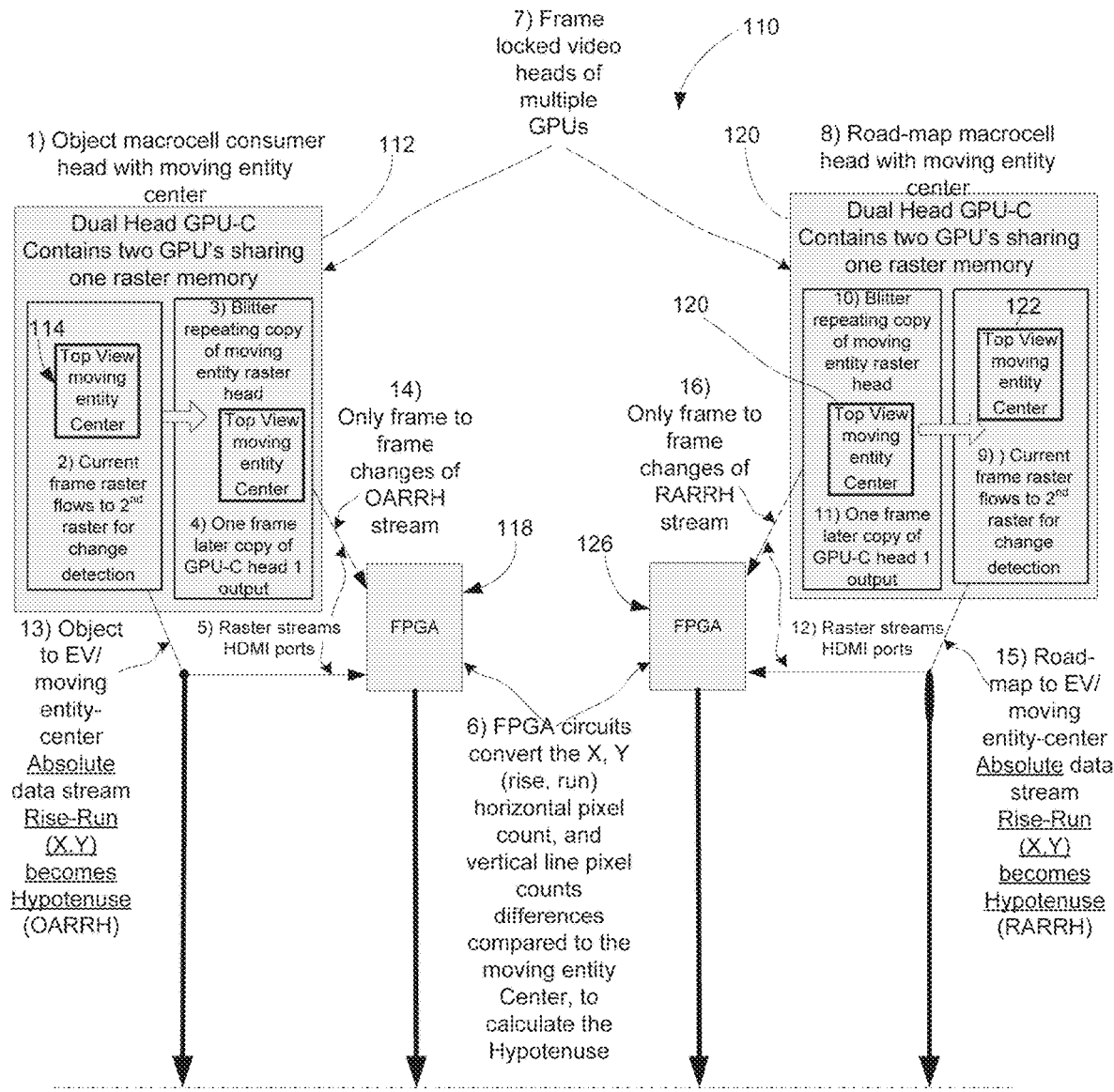
FIGS. 7A-7B are illustrations of a moving entity raster and road map raster with absolute and frame differences.
Figure 7B:
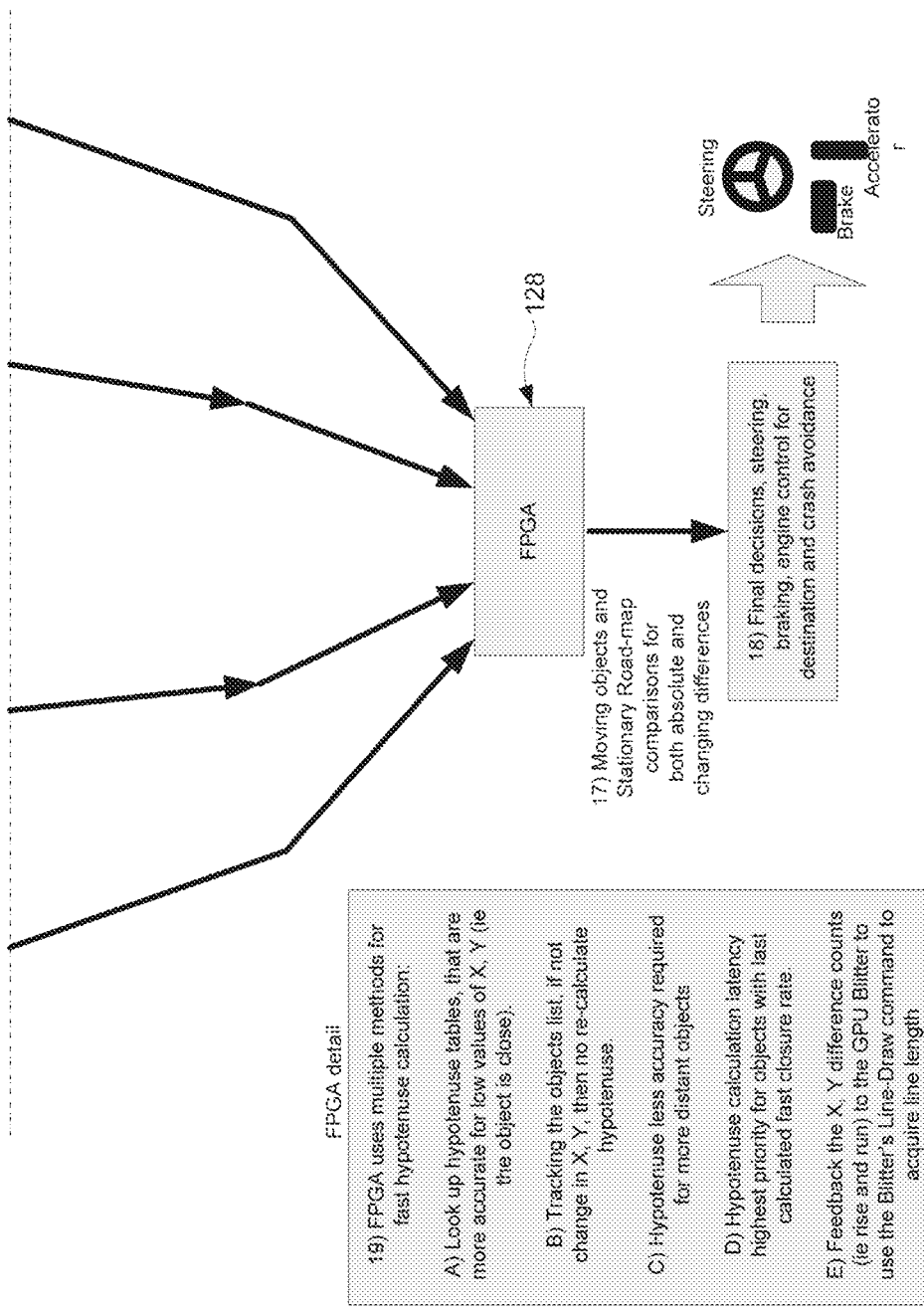

Figure Moving Entity Center (MEC)Raster and Road-Map Raster Absolute and Frame Differences from Two Dual Head GPU's and Turning next to FIGS. 7A-7B, illustrated therein is a moving entity raster and road map raster system 110 with absolute and frame differences. A dual head GPU-C 112 with two GPUs sharing one raster memory is provided. A moving entity center 114 is provided with current frame raster and head 1 of the GPU-C that flows to a second raster for change of directions. A second moving entity center 116 is a blitter repeating copy of the moving entity raster head that produces a one frame later copy of the GPU-C head 1 output. The raster streams output via an HDMI port to a first FPGA 118.

A road map macrocell head 120 is also provided that contains a dual head GPU-C that shares one raster memory. A moving entity center 122 is provided for head 1 that has a current frame raster that flows to the second raster for change detection. A second moving entity center 124 is a blitter repeating copy of the moving entity raster head and produces a one frame later copy of the GPU-C head 1 output. This output signal is streamed from the raster via HDMI ports to a second FPGA 126.

Both the dual head GPU-C 112 with moving entity centers 114, 116 and the road map macrocell head 120 are frame locked video heads. The output of the first dual head GPU-C 112 represents an object to the moving entity or moving entity center that is an absolute data stream of rise and run (X,Y) that becomes a hypotenuse OARRH. The output from the road map macrocell head is an absolute data stream of rise and run (X,Y) that becomes the hypotenuse RARRH. The first and second FPGAs 118, 126 convert the (X,Y) rise and run horizontal pixel count, and vertical line pixel count differences compared to the moving entity center to calculate the hypotenuse.

The output from the first and second FPGAs 118, 126 and the OARRH and RARRH are received at a third FPGA 128. This FPGA 128 uses multiple methods for fast hypotenuse calculations, including:
A) Look up hypotenuse tables, that are more accurate for low values of X, Y (i.e., the object is close).
B) Tracking the objects list, if no change in X, Y, then no re-calculation of
hypotenuse.
C) Hypotenuse requires less accuracy for more distant objects.
D) Hypotenuse calculation latency highest priority for objects with last calculated fast closure rate.
E) Feedback the X, Y difference counts (i.e., rise and run) to the GPU Blitter to use the Blitter's Line-Draw command to acquire line length.

The third FPGA 128 outputs moving objects and stationary road map comparisons for both absolute and changing differences. These outputs are processed for final decisions regarding braking, steering, and engine control for destination as well as crash avoidance.

Figure 8A:
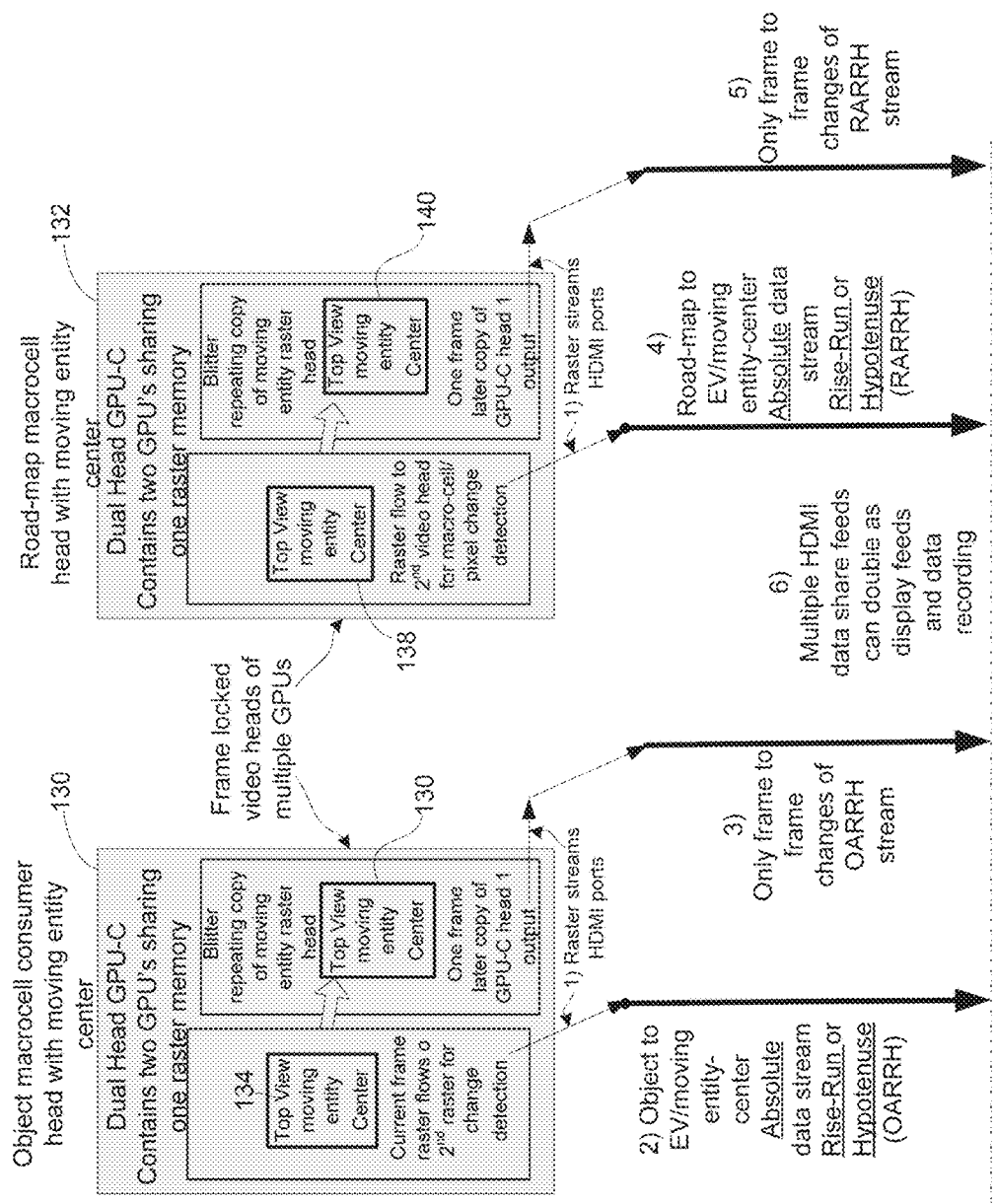
FIGS. 8A-8B are illustrations of all rasters HDMI fed to optional displays for product development or driver use.
Figure 8B:
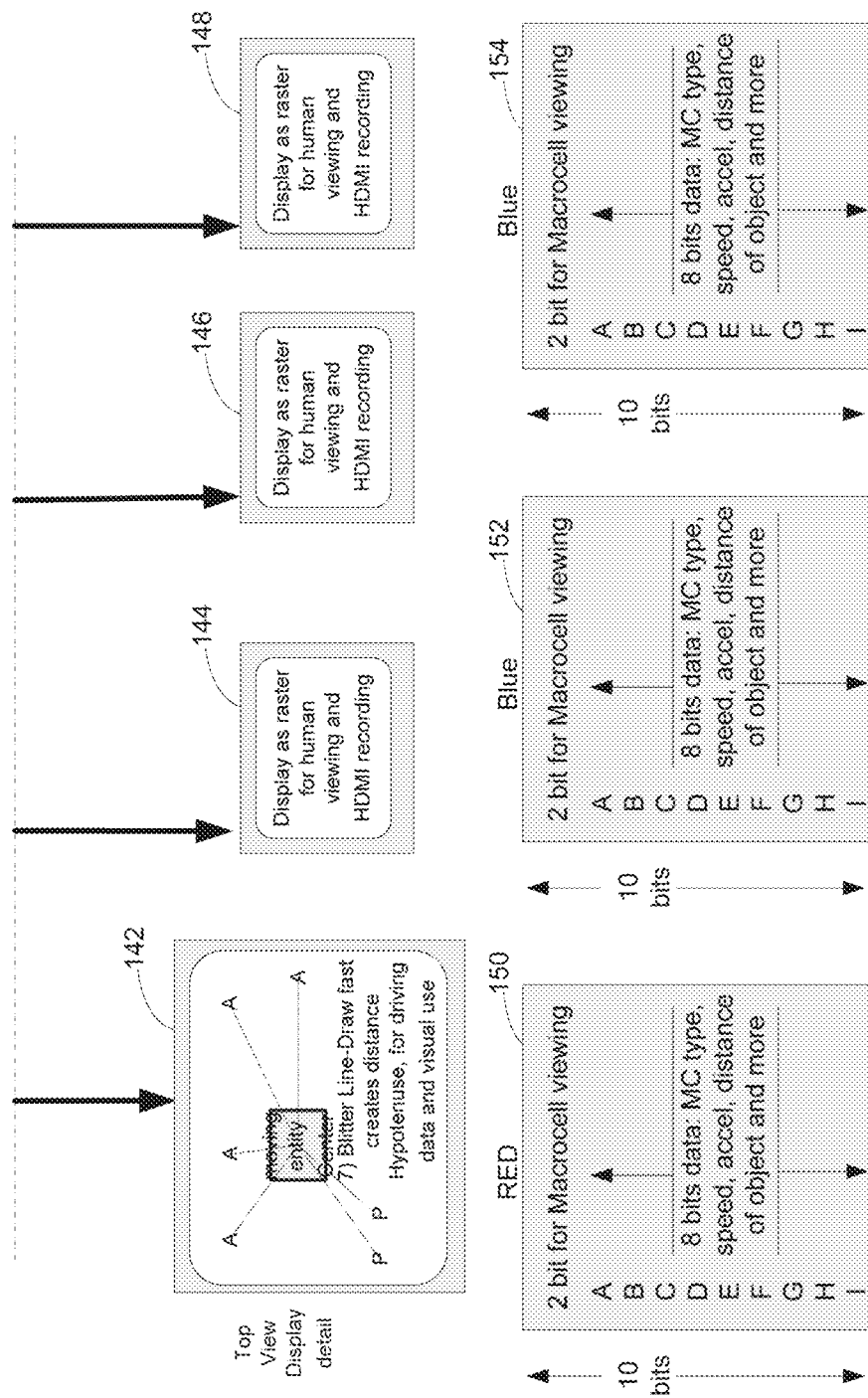

FIG. 8A are All Rasters HDMI Fed to Optional Displays for Product Development or Driver Use and FIG. 8B is an illustration of all rasters HDMI fed to optional displays for product development or driver use. An object macrocell consumer head 130 and road map macrocell head 132 are frame locked video heads with multiple GPUs. Each GPU has a moving entity center 134, 136, 138, 140, that generate four outputs. The first is an object to moving entity or moving entity center of an absolute data stream for rise and run or hypotenuse OARRH. The second is only a frame to frame change of OARRH stream. The third output is a road map moving entity or moving entity center of absolute data stream rise and run or hypotenuse RARRH. The fourth is only the frame to frame changes of the RARRH stream. These four outputs are input into respective displays 142, 144, 146, 148 that are configured for human viewing.

Also shown are the Red, Green, and Blue color pixels 150, 152, 154. The 32-bit color (10, 10, 10) bit RGB pixels, highest order, violate EFI/VESA XRGB and ARGB 32-bit pixel industry standards, however the pixel bits of highest order, (2 bits each) for R, G, B enable real-time human viewing and understanding of objects types locations in the rasters, and lower bits may be blocked from viewing. Both side view and top view macrocells are used simultaneously, and obtain feedback information from the final rasters. When better quality top views are not available, then side views, are an intermediate step, to create top view macrocells. No electronic system of computer processing, rasters and blitter logic and added glue logic, can be perfect, the goal here is to be as good as human driving or better. Humans for instance make assumptions about the depth axis, such as how thick/wide a vehicle is, even when the human cannot see all sides of it, from a mix of clues and historical norms. As a nearby vehicle is tracked from multiple view angles, over a period of frames, better quality of other vehicle size on all 3 axes is built into the real time tom-view macrocell.

Final rasters use only a top-down view, of mostly two-dimensional data set. Altitude data can be added to the pixelated data as an additional data factor, kept in the macrocells, and also height of a moving entity for safety while passing under bridges.

Figure 9A:
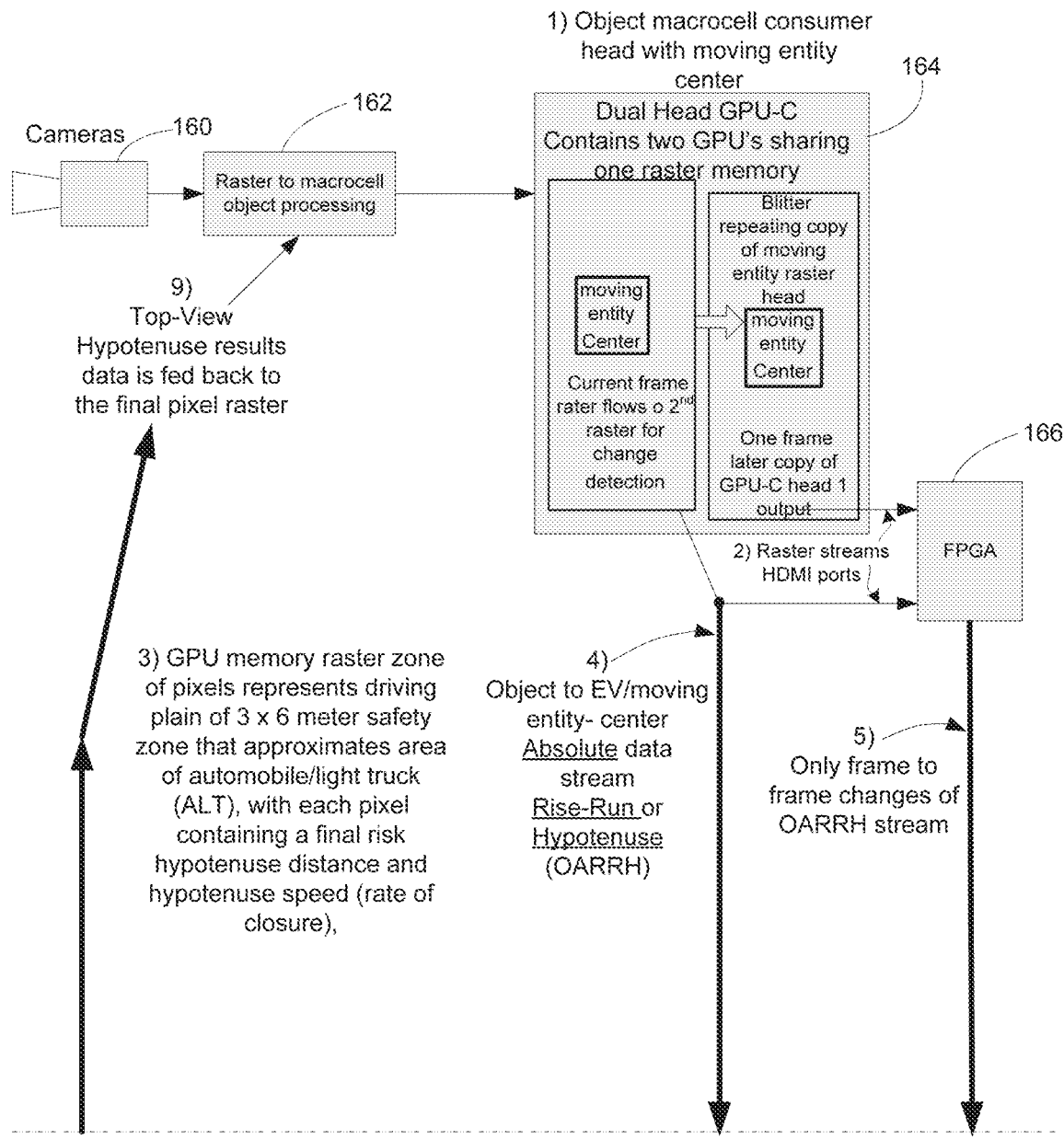
FIG. 9A-9B are illustrations of an all object raster's received feedback values of hypotenuse distance and closure rate.
Figure 9B:
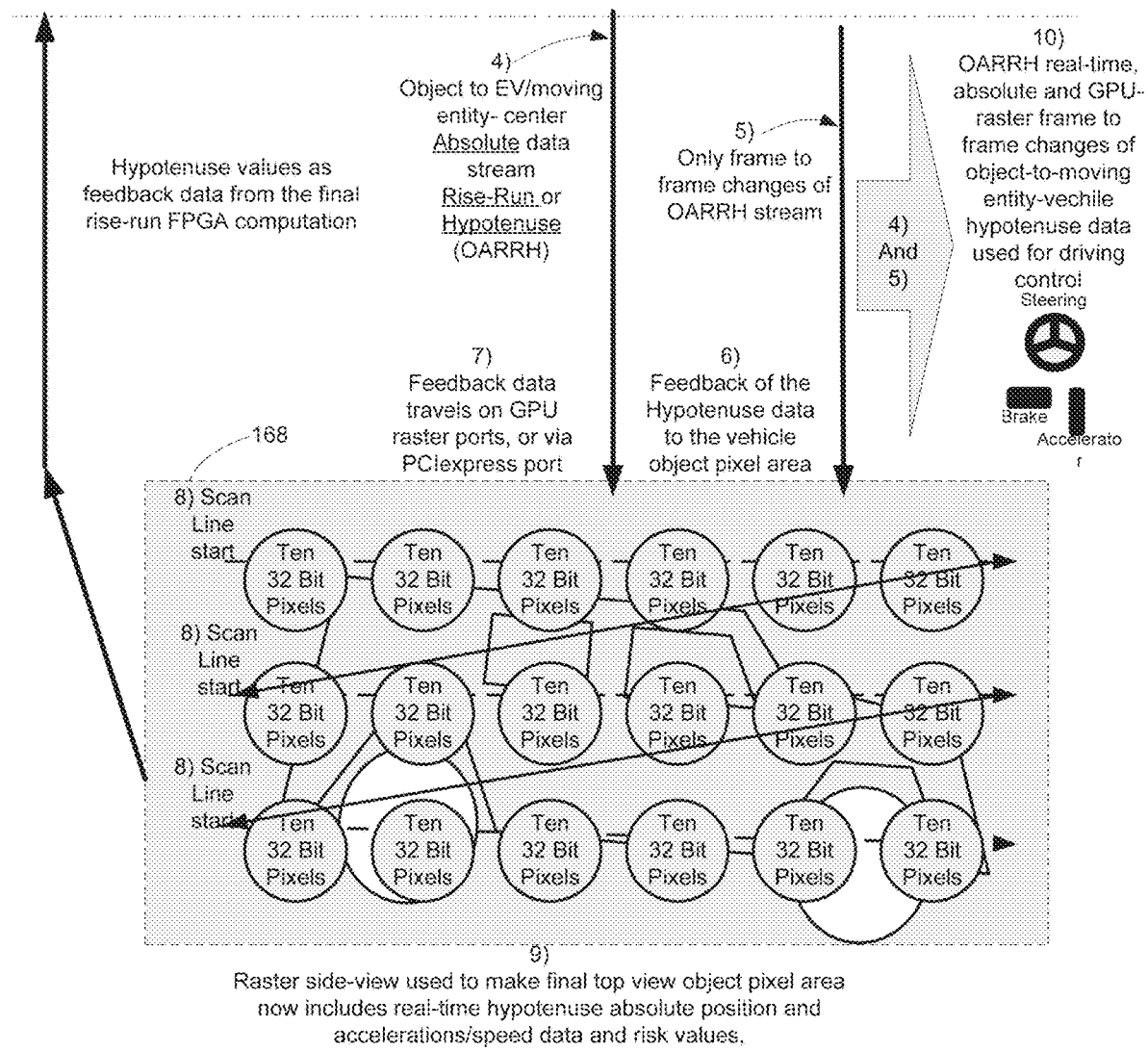

FIG. 9A illustrates all object top view rasters receiving feedback values of hypotenuse distance and closure rates, and FIG. 9B illustrates the Create Values of Hypotenuse Distance and Closure Rates for Feedback.

Figure 10:
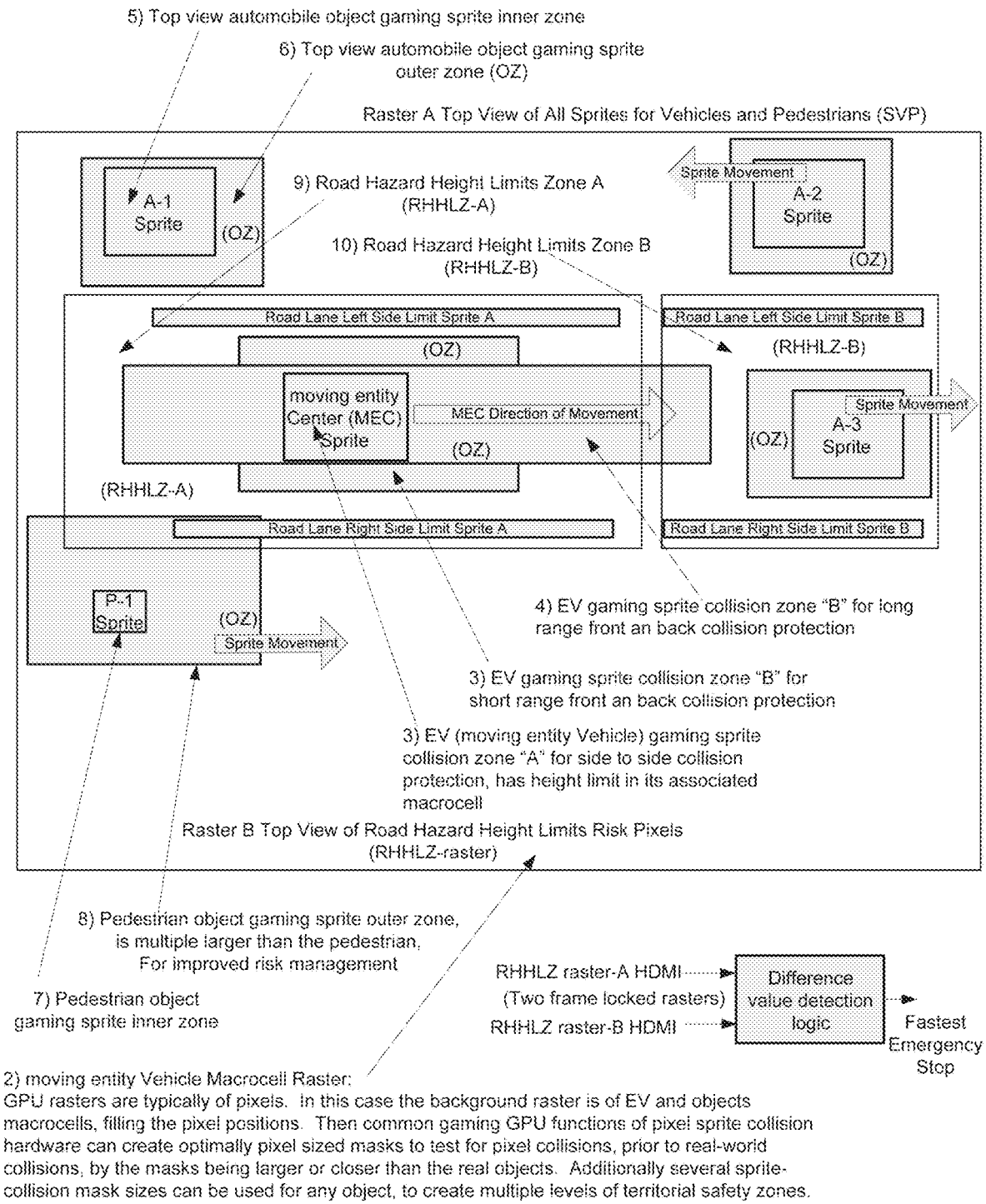
FIG. 10 illustrates video sprites dual-head GPU raster-A combined with raster-B pixels of road height limit values.

FIG. 10 illustrates video gaming GPU raster with virtual sprites-pre-collision circuits used for real-world driving pre-collision detection.

"Sprites" are a video hardware gaming method that dates back to the 1970s, and can now be used further for actual vehicle controls rather than virtual game figures, and to have outer zones for pre-collision. The Moving Entity Center (MEC)Raster sprite in the GPU hardware and the other vehicle sprites provide a new frame detection, of collision and pre-collision zones, even faster than frame to frame comparisons. The road edge can also be defined as a long skinny hardware GPU video sprite. The sprites have an inner zone of contact (such as a crash), and an outer zone for avoidance. And the outer zone OZ can be adjusted in the X, Y plane position, relative to the inner zone, for more safety effect in the higher risk direction.

FIG. 10 shows multiple use of overlapping sprites of crash-contact zones and outer risk zones, and side lane limit zones. All the sprites are layered on top of Road Hazard Height Limit risk zones raster monitoring for possible collisions with the outer zone, that is longer to the forward moving center entry direction of travel.

Pedestrians are provided an excessively large sprite protective outer zone. The sprites are all on raster A (video head A) of a dual head GPU, and the Height Limit risk pixels (that make up zones of overhead collision risk) are all on raster B (video head B) where the two video heads are frame locked, to the accuracy of better than 1 pixel. Thus all pixels of both rasters can be compared real time by both rasters HDMI digital RGB outputs streamed to logic gates for A to B rasters' difference values that indicate a possible approaching height collision with the moving entity center (MEC) outerzone sprite. Simultaneously all sprites are collision compared to the MEC outer zone sprite via typical GPU sprite features.

By using pixels of data, rather than more sprites, for road height risk, this system can accommodate both typical bridges over roads and complex indoor public garages with complex ceilings of many varying risks. The public garage ceilings would require more sprites than most video typical GPUs have.

This combination raster A with inner and outer zone sprites and raster B of numeric pixel data (that are numeric values of height restrictions) provides the fastest and most minimal GPU count, lowest power, and lowest cost, for safety braking and crash avoidance.

This single dual-head GPU sprite and pixel raster system can be used in combination with the more complex and higher GPU raster count macrocell system as a further safety backup and dual systems cross check.

Figure 11:
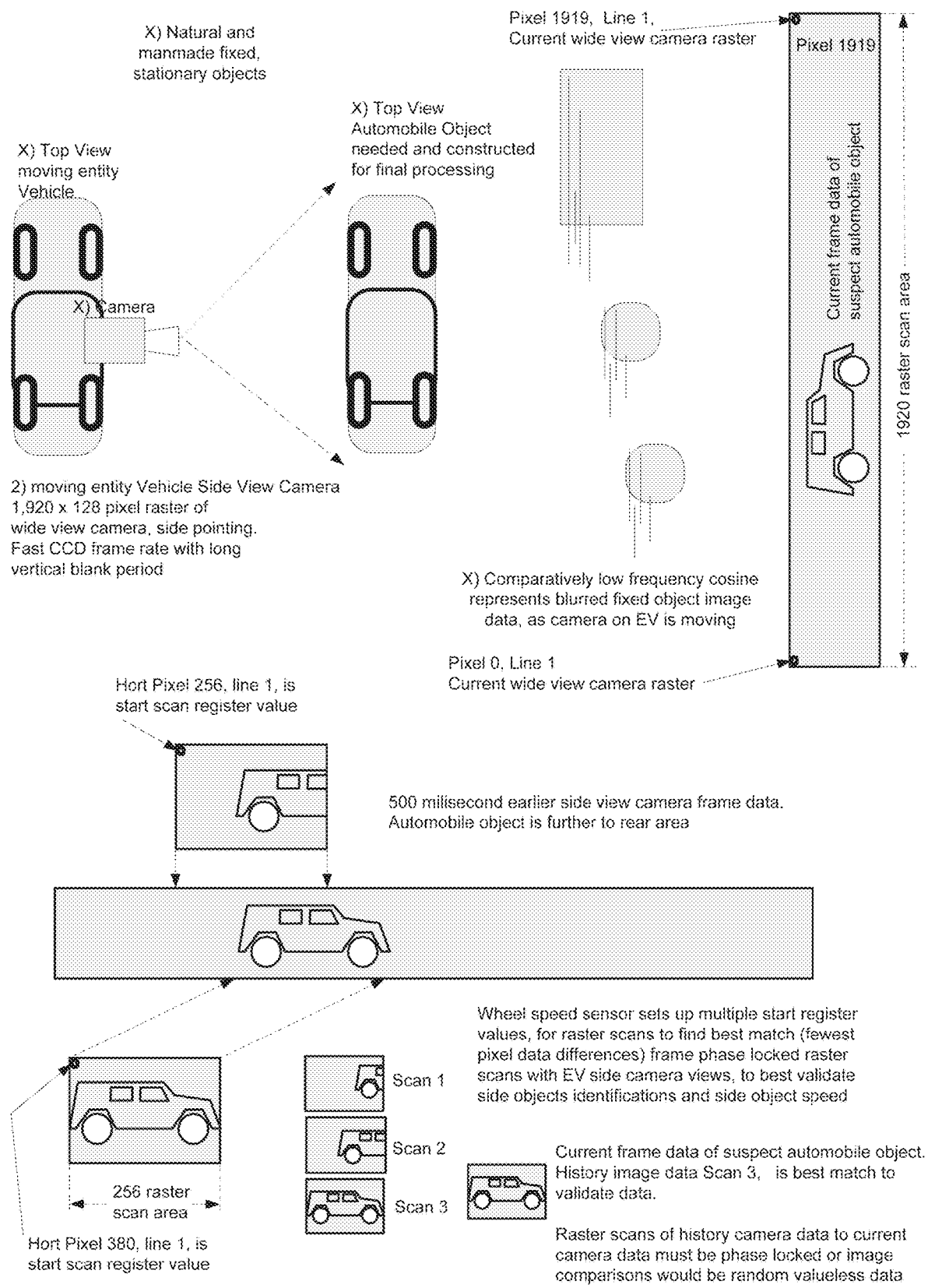
FIG. 11 shows phase locked video camera frames feedback video stream loop, for relative object speed processing, from difference pixels.

FIG. 11 shows Phase locked video camera frames feedback video stream loop, for relative object speed processing, from difference pixels. Both top camera views and side camera views are used in the multiple sequential camera scans and GPU difference pixel detection, to create data of relative speeds, vectors and object types.

The next step is to create the macrocell data; and then in other drawings and descriptions use the macrocell changing (difference over time) data for the hardware logic and software to process.

FIG. 12 illustrates long, narrow logical macrocell groups for positive train control, 540×4-kilometer track/risk zones, phase locked rasters frame-to-frame real-time difference detection. The four scan lines (1) of 32 bits deep macrocells (2) one pixel wide, is made up of two scan lines for trains, one (5) North-Train-Track (NTT), one (4) South-Train-Track (STT), and two additional outer safety zone scan lines, outside of and next to, the two tracks South and North Safety Zones (3) SSZ and (6) NSZ. (7) One large raster of four logical raster zones (temporally in repeated sequence) of, 4000×100 one-pixel-macrocells equals 4000 kilometer of track length. This method does the fast repeated testing of macrocell/pixel data that come from multiple sources of GPS on train, track (rail to rail) short circuit sensors, camera sensors, sound sensors, and data base for rail worker real-time locations. Any real-time combinations of data can sound warning audio and visual signals locally near the tracks, and to the train control center. Each real running length one meter of track and running length of one meter of and outer safety zone, is represented by one-pixel cell.

The nearness of the trains temporally near to raster pixel data changes is directly proportional to the actual risk. Train stations, train crossings, or designated risk zones (8) have devices to provide higher resolution of movements (changing difference local raster pixels) of pedestrians, and other local movement objects such as animals or rubber-tired passenger cars, motorcycles and truck vehicles, get compressed to smaller macrocells. A typical zone of one-meter length, is compressed to one safety macrocell.

Synchronizing and phase locking of the all the small fast scan frames, to larger macrocell frames is phase locked to improve reliability of data comparisons in real time, that all data is more temporally locked, and also more easily recorded. Frames and the subsequent synchronized data processing of the microcells within those multiple frames of frame 1, temporally followed by frame 2.

And whereas the proof of concept proves the circuits work in alignment with frame rate GPU generated interrupts, that trigger supporting software's in the test computer to further process parts of the system, that later a (proof of Prototype) more integrated ASIC (application specific Integrated Circuit) will later do, that is, a modest variation of common GPU IC's of both multi-head or multi-GPU's to obtain enough video display heads communicating raster and macrocell video streams from head to head with glue logic for this system.

And where proof of concept verifies detection of any changed pixels from frame to frame, and identify macrocell types and pre-production prototype.

Figure 13:
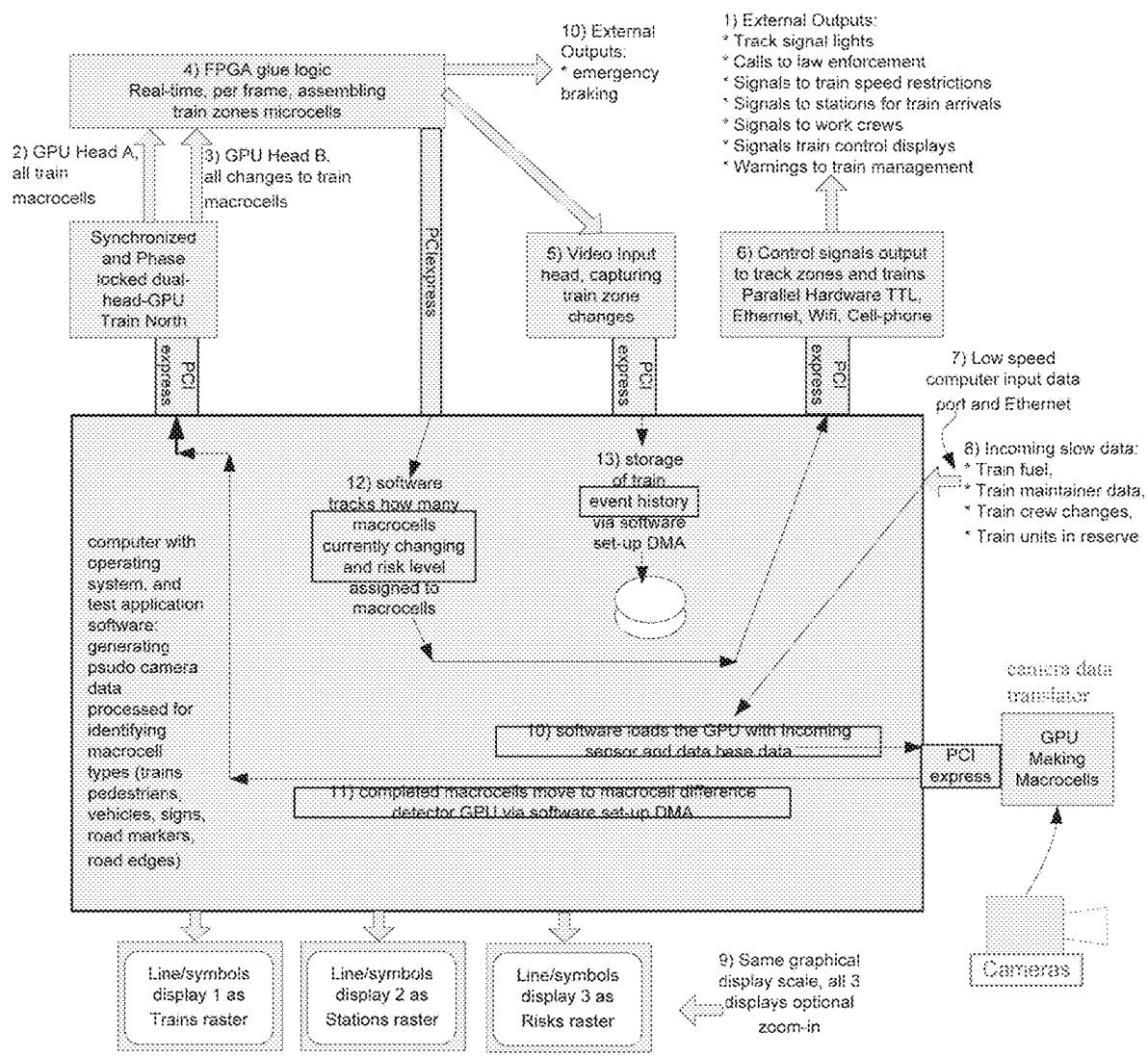
FIG. 13 shows low cost, high speed, failure resistant, train control GPU electrical parts and software setup.

FIG. 13 illustrates a low cost, high speed, failure resistant, Train Control GPU electrical parts and software setup. This shows a hardware GPU and software implantation of the earlier logical drawings and description. (1) External outputs such as train track signals for trains and more, are derived from (2), and (3) phase locked dual head GPU's with build in difference detection engines of frame to frame, of pixel and/or macrocell data where the (4) Excusive-OR difference function is in the FPGA.

The difference data is re-captured (5). By another phase locked video head.

Emergency data changes of braking can come directly from the GPU and FPGA.

Difference data of pixels and macrocells can also have some typical software attritional processing, before becoming more (6) output controls.

The additional software processing is typically affected by (7) slower incoming data such as (8) weather and maintenance data. (9) The train managers can view data on separate displays that concentrate data by types, such as train location, stations management, and risks management.

Figure 14:
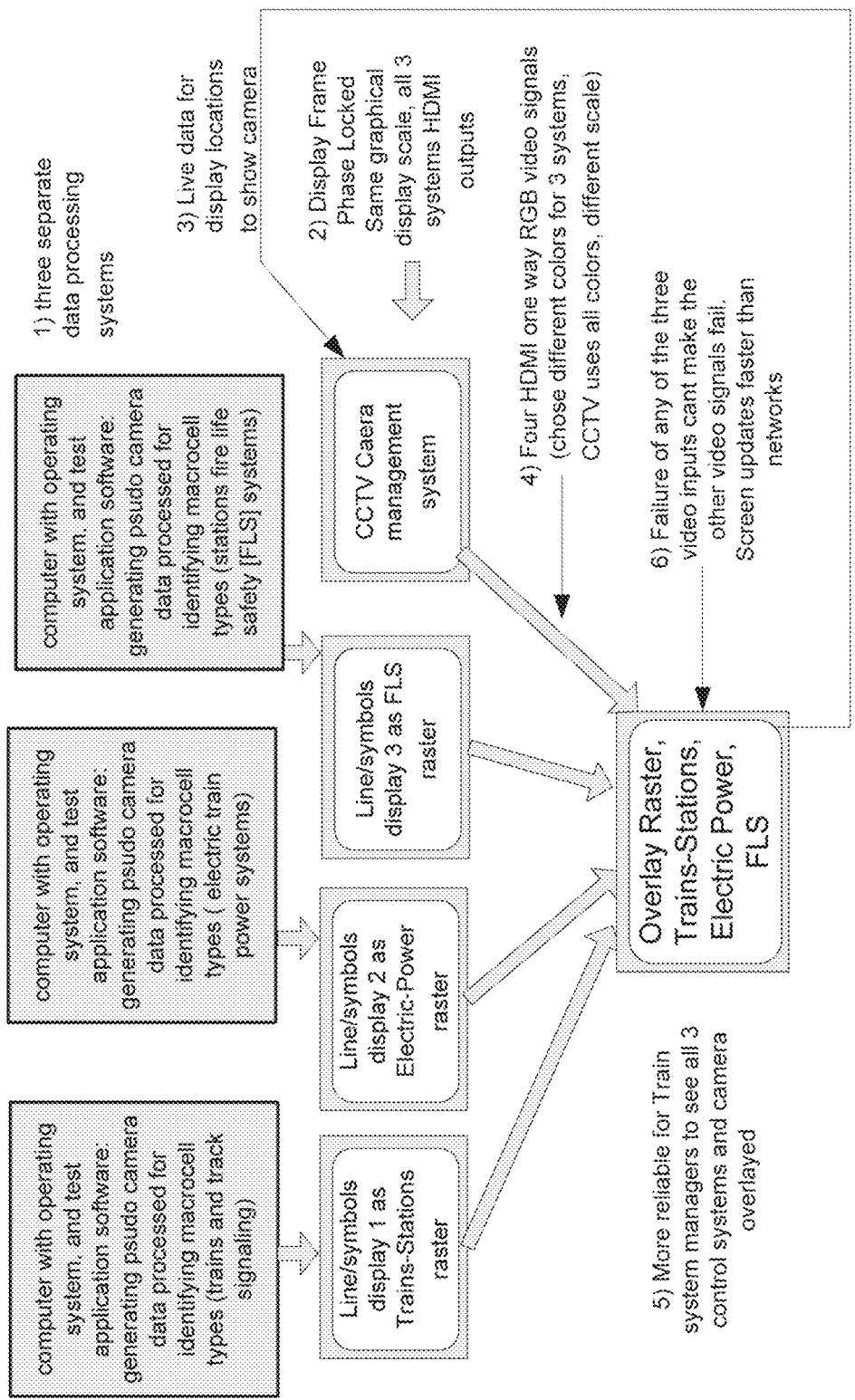
FIG. 14 illustrates a high reliability separated systems train or road traffic display system.

FIG. 14 illustrates high reliability separated systems train or road traffic display system, is complementary to the combination hardware GPU and software implementation of FIG. 13, except to contract all the multiple data types (1) to display all three to one display so controllers and managers can see matching scale overlay of all the various systems and (2) live cameras, and 3 the camera data translator takes in the screen coordinate position data to locate the camera views in the correct final screen-display area.

The (4) four HDMI one-way high-speed video data streams are phase locked (6). This is faster for final screen updates than a network can move data, and (5) the final result is more reliable than network data transfers, especially for lacking temporal jerks due to network load variations.

Figure 15:
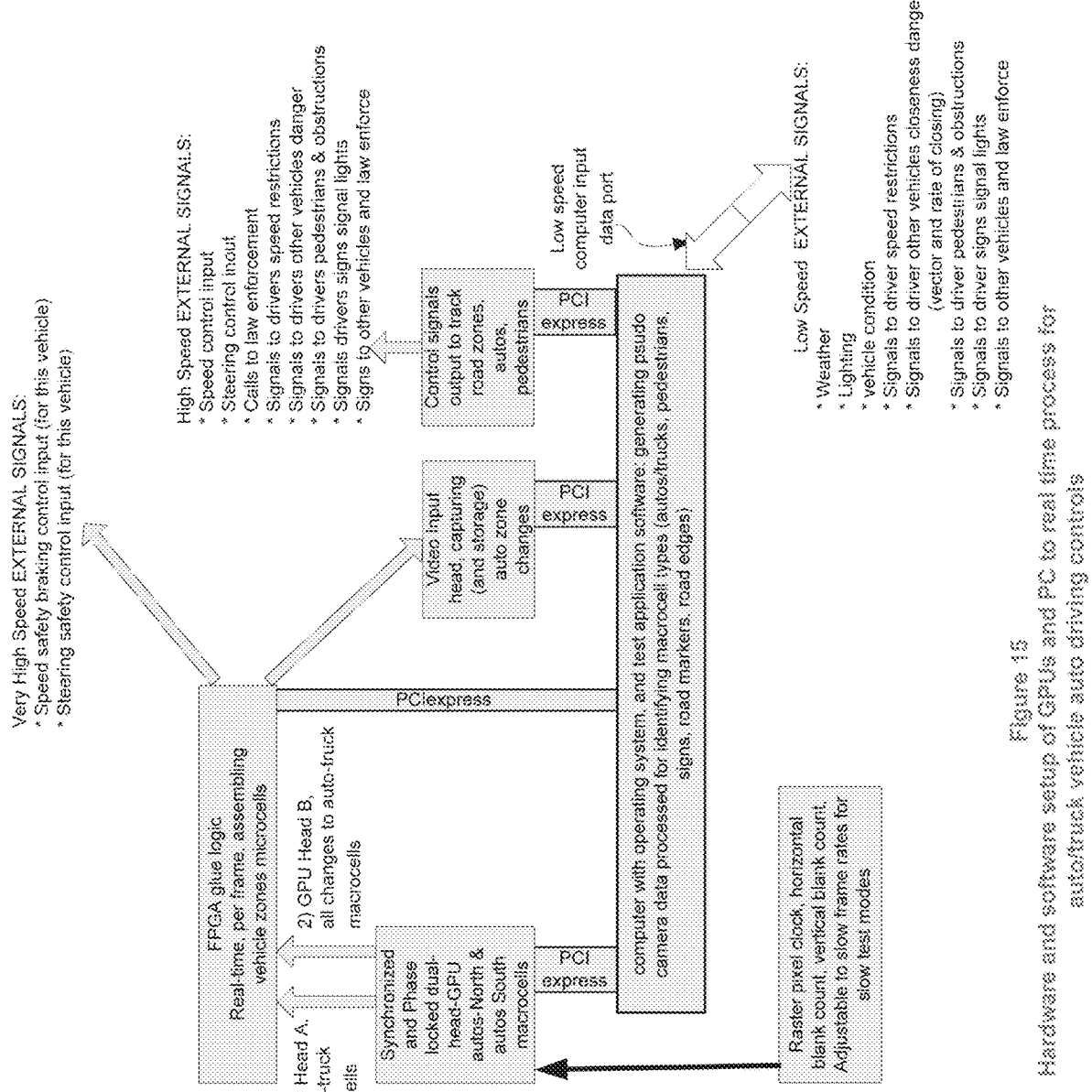
FIG. 15, illustrates a hardware and software setup of GPUs and PC to real time process for automobile, truck, and other vehicle automatic driving controls.

FIG. 15 illustrates a hardware and software setup of GPUs and PC to real time process for vehicle automatic driving controls uses a synchronized and phase locked dual head GPU to make two output LVDS or HDMI data streams of the cars-north and cars-south macrocells, and the real-time next frame difference data to indicate the real-time changes. Next the PCI Express bus managed, FPGA glue logic of exclusive-OR gates sorts out the difference macrocell data, and directs to the GPU capture video head. This FPGA glue logic also uses the rise-run and hypotenuse vectors and rates of change to make very high-speed changes to braking and steering for safety.

Next the capturing is both recorded on the computers data storage, and is processed by the computer software in typical interrupt and round robin style code. The software code both receives and transmits slow speed external data and signals of weather, lighting levels, speed restrictions, danger-closeness signals regarding other vehicles, signals to the local driver of pedestrian, obstruction, signal lights, signs, and other signals to law enforcement and other vehicles.

For testing the entire automobile/truck driving system (also known as ADS Automated Driving System), and also maintaining viewing screens that operate at standard VESA refresh rates, the raster pixel clock, horizontal blank count, vertical blank count are adjustable to slow frame rates for slow test modes. These slow modes allow a live human test driver to have faster reaction than the driving computer, as a final safety measure to avoid test accidents.

The camera(s) 160 outputs to a raster-to-macrocell processing block 162. This block 162 in turn outputs to an object macrocell consumer head 164 that is a dual head GPU-C sharing one raster memory. The two outputs are received at an FPGA 166 that in turn outputs only frame to frame changes to a raster object pixel area or array 168 that now includes real-time hypotenuse absolute position and accelerations and speed data and risk values. The first head of the dual head GPU-C outputs an object to moving entity vehicle or moving entity center absolute data stream rise and run or hypotenuse OARRH to the raster object pixel area. This represents feedback data that travels on GPU raster ports or via a PCI express port. In addition, the OARRH output and the frame to frame changes of the OARRH stream are used for OARRH real time, absolute, and GPU raster frame changes of object to moving entity hypotenuse data that is used for driving control, including steering, brake, and acceleration.

The GPU memory raster zone of pixels represents driving plane of 3×6 meter safety zone that approximates area of automobile/light truck (ALT), with each pixel containing a final risk hypotenuse distance and hypotenuse speed (rate of closure), hypotenuse values as feedback data from the final rise-run FPGA computation. In addition, the hypotenuse results data is fed back to the pixel raster processing block 162.

As will be readily appreciated from the foregoing, rather than sprites being just a gaming symbolic representation, the outcomes of collisions will have impact on the real world vehicle control to avoid objects. Sprites are used not just for small gaming object symbols, but to also act on real-world, physical and very long objects, such as a painted dividing line on a road, by having very long narrow pixel sprites, and to cut excessively long real world objects into smaller ones (like sliced bread, rather than a loaf), such that the disclosed sprite video control controller circuits for the sprites can use multiple sprites, to represent the executively long real world object or its symbol. In addition, by cutting the very long object into smaller slices, the control outputs can localize the physically near risks as more important than far risks. Unlike game applications where pretend objects can collide with one another and not sustain damage or can be repaired instantly, the implementations disclosed herein work within the framework of the real, physical world to address its limitations, including low to zero tolerance for unintended collisions with resultant property damage and bodily injury or death.

These methods for improved self-driving and driver-assisted cars and trucks and automatic control of trains, have a strong reliance not on the usual computer processor and program that runs either round robin software loops, or by a software interrupt basis to obtain the resultant control and risk notification, but rather the core elements are that of a multiple GPUs graphics processor units, that when phase locked also known as fully coherent multiple periodic rasters, process data faster as an group of rasters, moving data from raster to raster with processing, with less cost and more reliability. These periodic GPU rasters feed data into following phase locked rasters, have improved data processing speed, in similar fashion that human brain can process tasks faster when Phase Lock Value (PLV) is improved, whereas the brain oscillatory cycles can align over time. Simulations of PLV biologic neural studies could be undertaken with this same self-driving system. By comparing a phase locked system of rasters that serially, and progressively, flow processed data, from raster to the next raster, via output and input ports, and also purposely straying away from phase lock of the multiple periodic rasters, by changing the raster to raster relationships to variations of out-of-phase and period (also known as out-of-coherence), this can quickly simulate many frame-cycles. The many, fast obtained cycles with phase and period variations, can to provide the many processing results that PLV statistical studies require.

The GPUs also act as main components of real-time pixel (and thus also macrocell) cyclic temporal differences that happen with the real time data from many sources. GPU integrated Circuits (IC) is a more recent computer industry nomenclature when more features became common, to include video input ports, typically used for camera input that came after the earlier named Video Controller (VC) that typically was a video output integrated IC only. The video frame phase locking of GPUs (to include GPU's with camera input video heads) obtains another improvement in speed of data processing, while at the same time the users can more reliably rely on the accuracy of processing results, because of not waiting for multiple video frames to pass, to have confidence that data-items in one frame of data with geographic position association, did get compared to other frames of data with geographic position association.

Another method herein is for a moving vehicle, that requires automatic control, maintains a logical geographic centering in the GPU raster data field, herein called the moving entity center. This moving entity centering allows the raster for risk management to be as small as possible, thus can be periodic cycle repeatedly scanned by the GPU faster than a human can track the changes going on around that person's self. Also the real time manufacturing of the macrocells prior to final raster tracking for difference detection, is done by combining GPU's rasterizing of object data, and applying both or either GPU "blitter" logic (graphic pixel data block line transfer or Boolean calculations) or by added FPGA circuits, to compress down real world risk objects or groups of same, into a phase locked (thus minimal temporal delay for data usage) single pixel. Or just a few pixels of macrocells. Last, the real time macrocells are difference compared over passing frames, and to the moving entity center positions of vehicles or trains. This faster data is also compared with slow changing data via more common processor and software methods, for data outputs. The most critical of all data outputs of braking (cars, trucks, trains or aircraft), or steering can be directly from the FPGA logic attached to the GPU for millisecond performance, and depending on where the frame scan is presently between its start and end, it can be nano-seconds for the safety reaction output to occur. Also, that the rasters being typical operating on data in an X, Y two-dimensional coordinate system, can, with the aid of blitter logic or add-on FPGA circuits, calculate the hypotenuse of the actual distances from the moving entity center (the driving car, truck or train, or aircraft) that the user seeks to provide safety, and best speed of travel to.

With the enlargement of the rasters, and using large pixel bit depth values, a $3^{rd}$ axis of Z, can be controlled, in order to process objects the user wants to provide safety to, such as aircraft.

The various implementations described above can be combined to provide further implementations. Aspects of these implementations can be modified, if necessary, to employ concepts of the various patents, applications, and publications disclosed herein and known to those skilled in the art to provide yet further implementations.

These and other changes can be made to the disclosed implementations in light of the above detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the present disclosure.

The invention claimed is:

1. A system for controlling movement of a vehicle having a path of movement and detecting an object in the path of movement of the vehicle, the vehicle having an electronic control system to control the directional movement and speed of the vehicle, the system comprising:
a camera system mounted on the vehicle and configured to generate image signals of terrain within the vehicle path of movement of the vehicle;
a radar system mounted on the vehicle and configured to generate distance signals to an object in the terrain;
a processor coupled to the camera system, to the radar system, and to the electronic control system of the vehicle, the processor structured to determine a relative speed of the vehicle with respect to the object in the path of movement of the vehicle and to generate control signals to the electronic control system to alter the directional movement of the vehicle or the speed of the vehicle or both so that the object is no longer in the path of movement of the vehicle, the processor comprising multiple GPU rasters in a series data processing configuration that are configured to utilize a hypotenuse processing function for drawing lines from pixel to moving entity center (MEC) or from macro cell center to MEC, and a detector configured to test for raster frame lock between the multiple GPU rasters.

2. The system of claim 1 wherein the multiple GPU rasters are configured from sprite-collision gaming hardware for pre-detecting a vehicle collision with the object and to provide lane guidance to avoid the vehicle collision with the object.

3. The system of claim 1 wherein the multiple GPU rasters comprise a first raster and a second raster that are frame locked and configured to have an error less than 1 pixel clock.

4. The system of claim 1 wherein the processor is configured to generate from the multiple GPU rasters a first raster output stream and a second raster output stream of the MEC, the processor further configured to provide object sprites and outer zone sprites that are overlaid and off center from the object sprites in favored method of a fast risk management by the object to the vehicle, the processor further configured to provide road-lane side limit sprites that are overlaid on the second raster output stream, the second raster output stream comprising road height risk pixels, the processor configured to use logic gates to compare the road-lane side limit sprites to the road height risk pixels and to generate a crash avoidance signal, the processor also configured to simultaneously compare an X/Y position of each of the multiple GPU rasters to each other as a safety backup to generate a crash avoidance signal for fast rate crash avoidance control of the vehicle.

5. The system of claim 1, further comprising shared public cameras that are coupled to the processor and configured to provide camera data streams or object microcells data of additional objects, and wherein the camera data streams or object macro cell data of the shared public cameras are transmitted and received at the processor at faster frame rates than a frame rate of the camera system coupled to the processor to provide improved input temporal data and responses to the data by a final driving decision frame processor raster of the multiple GPU rasters.

6. The system of claim 5 wherein the multiple GPU rasters comprise a continually scanned top view raster that is configured to move a center of the object in response to movement of the object and to determine risk pixels or macrocells in the final driving decision frame processor raster that present a risk of collision with the vehicle.

7. The system of claim 5 wherein in response to a collision of the vehicle with the object the camera data streams or macro cell data from the shared cameras along with full rasters data from the camera system on the vehicle are recorded.

8. The system of claim 1 wherein the processor and the multiple GPU rasters are structured to review raw pixel data of X, Y, and Z axis data as altitude data by use of large pixel bit values, with raw pixel data compressed down to pixels.

9. A system whereby phase locking of displays associated with the multiple GPU rasters of multiple systems provide transportation systems operators with the ability to exactly compare geotropic locked results, of disparate complex systems, to include real-time camera view, with relativity and real time data processing speeds expected by viewing persons.

10. A system whereby long narrow rasters containing compressed data of train macrocells that are frame locked represent train tracks, train occupancy, and near to track macro cells of pedestrian and all obstacle types are fed to logic value detection at the real-time GPU rasters frame rate to provide high speed anti-collision control and general train system control.

* * * * *